US006519590B1

(12) United States Patent
Reddy

(10) Patent No.: US 6,519,590 B1
(45) Date of Patent: Feb. 11, 2003

(54) SYSTEM AND METHOD FOR PERFORMING A MINDFLOW PROCESS USING A MINDFLOW DOCUMENT ARCHIVE

(75) Inventor: Jayaram P. Reddy, Frisco, TX (US)

(73) Assignee: Mindflow Technologies, Inc., Plano, TX (US)

( * ) Notice: Subject to any disclaimer, the term of this patent is extended or adjusted under 35 U.S.C. 154(b) by 0 days.

(21) Appl. No.: 09/371,712

(22) Filed: Aug. 9, 1999

(51) Int. Cl.[7] .............................. G06F 17/30; G06F 7/00
(52) U.S. Cl. ................................ 707/5; 707/10; 706/46
(58) Field of Search ................... 707/3–4, 5; 706/45–48

(56) References Cited

U.S. PATENT DOCUMENTS

| | | | | |
|---|---|---|---|---|
| 5,257,185 A | * | 10/1993 | Farley et al. | 707/100 |
| 5,355,497 A | * | 10/1994 | Cohen-Levy | 707/200 |
| 5,412,758 A | | 5/1995 | Srikanth et al. | 395/75 |
| 5,493,729 A | * | 2/1996 | Nigawara et al. | 706/52 |
| 5,630,127 A | | 5/1997 | Moore et al. | 395/615 |
| 5,644,686 A | * | 7/1997 | Hekmatpour | 706/45 |
| 5,696,916 A | * | 12/1997 | Yamazaki et al. | 345/356 |
| 5,806,060 A | * | 9/1998 | Borgida et al. | 505/3 |
| 5,822,743 A | * | 10/1998 | Gupta et al. | 706/50 |
| 5,835,900 A | * | 11/1998 | Fagg, III et al. | 706/11 |
| 5,890,149 A | * | 3/1999 | Schmonsees | 707/3 |
| 6,078,924 A | * | 6/2000 | Ainsbury et al. | 707/101 |
| 2001/0049688 A1 | * | 12/2001 | Fratkina et al. | 707/104.1 |

OTHER PUBLICATIONS

Moldovan, D. et al. "LASSO: A Tool for Surfing the Answer Net", Proceedings of the 8th Text REtrieval Conference (TREC–8), 1999.*
Hawkins, D.T. "Applications of Artificial Intelligence (AI) and Expert Systems for Online Searching", Online, vol. 12, No. 1, Jan. 1998, pp. 31–43.*
International Search Report in International Application No. PCT/US 00/19586 dated Jun. 22, 2001, 6 pages.

* cited by examiner

Primary Examiner—Jean R. Homere
Assistant Examiner—Luke S Wassum
(74) Attorney, Agent, or Firm—Baker Botts L.L.P.

(57) ABSTRACT

A system for retrieving documents includes a memory coupled to a processor. The memory stores a number of documents, each document comprising a number of first answers to a first group of questions and a number of second answers to a second group of questions. The processor presents to a knowledge worker the first group of questions and the second group of questions. The processor further retrieves from the memory those documents having a predetermined number of first answers matching the answers of the knowledge worker to the first group of questions and a predetermined number of second answers matching the answers of the knowledge worker to the second group of questions.

24 Claims, 26 Drawing Sheets

Mindflow Management

Item Description # _____    Item # _____    SM # _____
Item Spend # _____

⎫ 138

| Item Classification | Food & Paper | Office Supplies | Equipment |
|---|---|---|---|
| Is the relative spend on the Item | High | | Low |
| Is the Item a CRITICAL Item for the company: | Yes | | No |
| Are the customer demands for the Item | R & D Intensive | Standard | Transaction Intensive |

⎫ 140

[BACK] 106    [SAVE] 142    [EXECUTE] 144    [PRINT] 146    [NEXT] 104

Mindflow Management

Item Description # ___  Item # ___  SM # ___

↙ 46

Cost Savings Opportunities

|   |   | R&D | Procurement | Supplier | Operations | Others |
|---|---|---|---|---|---|---|
| 1 | Track RM cost driver markets and review supplier procurement strategies to ensure low costs | X | ✓ | ✓ |   |   |
| 2 | Select suppliers who have a strategic/competitive advantage in sourcing RM (vertically integrated, Partnerships, etc.) |   |   |   | X |   |
| 3 | Actively risk manage the Item if the spend is high either through the supplier or internal Risk Management Group |   |   |   |   |   |
| 4 | Identify supply location with lower wage rates |   |   |   |   |   |
| 5 | Avoid price increases by appropriately timing the contract process |   |   |   |   |   |
|   | ∘∘∘ |   |   |   |   |   |
| n | Work with R&D to approve more RM suppliers for the Item |   |   |   |   |   |

164 ⟩ (columns bracket)

[BACK] 106   [SAVE] 142   [NEW] 166   [EXECUTE] 144   [PRINT] 146   [NEXT] 104

Mindflow Management

Item Description # _____   Item # _____   SM # _____

Evaluate Cost Savings Opportunities  ← 46

| | | Est. Savings ($) | R&D Resources ($) | Time Required |
|---|---|---|---|---|
| 1 | Work with R&D to approve more RM suppliers for the Item | 100,000 | 50,000 | 6 Months |
| 2 | Consolidate the Item supplier base to offer higher volumes to fewer suppliers | 500,000 | 150,000 | 3 Months |
| 3 | Re-engineer the Item to lower process complexity | 1,000,000 | 200,000 | 12 Months |
| 4 | Work with R&D and Operations to approve a larger pack size to reduce packaging costs | 75,000 | 50,000 | 6 Months |

172 ─┘         174 ─┘
3 Months
6 Months
12 Months

106 — BACK   142 — SAVE   144 — EXECUTE   146 — PRINT   104 — NEXT

| QUESTION INFORMATION 230 | | | QUESTION STATUS 256 | ANSWER INFORMATION 232 | | |
|---|---|---|---|---|---|---|
| QUESTION IDENTIFIER 250 | QUESTION WEIGHTING FACTOR 252 | QUESTION 138 | | ANSWER TYPE 258 | ANSWER 140 | RULE FUNCTION IDENTIFIER 262 |
| Q1 | 1 | ITEM CLASSIFICATION | I | S | F&P OFFICE SUPPLIES EQUIPMENT | TID1 --- --- |
| Q2A | 1 | IS THE RELATIVE SPEND ON THE ITEM | I | S | HIGH LOW | TID2 TID3 |
| Q2B | 1 | IS THE RELATIVE SPEND ON THE ITEM | I | S | HIGH LOW | TID4 TID5 |
| Q3 | 1 | IS THE ITEM A CRITICAL ITEM FOR THE COMPANY: | I | S | YES NO | --- --- |
| Q4 | 1 | IS THE PRODUCT LIFE CYCLE IN WHICH THE ITEM IS USED IN A | D | S | GROWTH PHASE MATURE PHASE | --- --- |
| Q5 | 1 | INDUSTRY CAPACITY FOR THE ITEM | I | S | SUPPLY > DEMAND SUPPLY < DEMAND | --- --- |
| Q6 | 1 | BUYER LEVERAGE | I | S | POWER OF SUPPLIERS > POWER OF BUYERS POWER OF SUPPLIERS < POWER OF BUYERS | TID6 TID7 |
| Q7 | 1 | IS RAW MATERIALS PROCESSING YIELDS A KEY ITEM COST DRIVER | I | S | YES NO | TID8 TID9 |
| ... | ... | ... | ... | ... | ... | ... |

210 → RULE FUNCTION 270

| 262 | 272 | 274 | 276 | 278 | 280 |
|---|---|---|---|---|---|
| RULE FUNCTION IDENTIFIER | INITIAL VALUE | OPERATIOR | DISCRIMINANT | QUESTION GROUP IDENTIFIER | QUESTION GROUP WEIGHTING FACTOR |
| TID1 | NULL | EQ | F&P | G1 | 1 |
| TID2 | NULL | EQ | HIGH | G2 | 0.5 |
| TID3 | NULL | EQ | LOW | G3 | 0.5 |
| TID4 | NULL | GE | 2 | G4 | 1 |
| TID5 | NULL | EQ | 1 | G5 | 1 |
| TID6 | NULL | EQ | POWER OF SUPPLIERS > POWER OF BUYERS | G6 | 1 |
| TID7 | NULL | EQ | POWER OF SUPPLIERS < POWER OF BUYERS | G6 | 1 |
| TID8 | NULL | EQ | YES | G8 | 1 |
| TID9 | NULL | EQ | NO | G8 | 1 |
| TID10 | NULL | EQ | YES | G10 | 1 |
| TID11 | NULL | EQ | NO | G10 | 1 |
| TID12 | NULL | GT | 10 | G12 | 1 |
| TID13 | NULL | GT | 1.1 | G13 | 1 |
| TID14 | NULL | GT | 1.1 | G14 | 1 |
| TID15 | NULL | GT | 1.1 | G15 | 1 |
| TID16 | NULL | GT | 1.1 | G16 | 1 |
| TID17 | NULL | GT | 1.1 | G17 | 1 |
| TID18 | TRUE | --- | --- | G18 | #Q25A |
| TID19 | TRUE | --- | --- | G18 | #Q25B |
| TID20 | TRUE | --- | --- | G18 | #Q25C |
| TID21 | TRUE | --- | --- | G18 | #Q25D |
| TID22 | | | | G19 | 1 |
| TID23 | NULL | EQ | OTC ANIMAL-BASED COMMODITY | G20 | 1 |
| TID24 | NULL | EQ | NON OTC ANIMAL-BASED COMMODITY | G21 | 1 |
| TID66 | NULL | GT | 4 | G66 | 1 |
| TID67 | NULL | LT | 4 | G67 | 1 |
| TID68 | NULL | EQ | NO | G68 | 1 |
| TID69 | NULL | EQ | YES | G69 | 1 |
| ⋮ | ⋮ | ⋮ | ⋮ | ⋮ | ⋮ |

| QUESTION GROUP IDENTIFIER | ASSOCIATED QUESTION IDENTIFIERS |
|---|---|
| S1 | Q1 |
| S2 | Q2A |
| T2 | Q2B |
| T3 | Q3 |
| T6 | Q6 |
| G1 | Q20 |
| G1 | Q21 |
| G1 | Q22 |
| G1 | Q23 |
| G1 | Q24 |
| G1 | Q25 |
| G2 | Q60 |
| G2 | Q61 |
| G2 | Q62 |
| G3 | Q63 |
| G4 | Q72 |
| G5 | Q73 |
| G6 | Q66 |
| G8 | Q64 |
| G10 | Q55B |
| G12 | Q31 |
| G13 | Q68 |
| G14 | Q70 |
| G14 | Q4 |
| G15 | Q55A |
| G15 | Q56 |
| G15 | Q57 |
| G16 | Q58 |
| G16 | Q59 |
| G17 | Q71 |
| G18 | Q32 |
| G18 | Q33 |
| G18 | Q34 |
| G18 | Q35 |
| G18 | Q36 |
| G19 | Q41 |
| G20 | Q46 |
| G20 | Q47 |
| G20 | Q48 |
| G21 | Q42 |
| G21 | Q43 |
| G21 | Q44 |
| G21 | Q45 |
| G66 | Q67 |
| G67 | Q67 |
| ⋮ | ⋮ |

FIG. 5D

| QUESTION IDENTIFIER | ANSWER IDENTIFIER | KNOWLEDGE ITEM GROUP WEIGHTING FACTOR | KNOWLEDGE ITEM GROUP IDENTIFIER |
|---|---|---|---|
| Q1 | OFFICE SUPPLIES | 0.5 | SV16 |
| Q1 | EQUIPMENT | 0.5 | SV17 |
| Q4 | GROWTH PHASE | 0.5 | SV15 |
| Q4 | MATURE PHASE | 0.5 | NULL |
| Q9 | 3 | 1 | ST1 |
| Q9 | 4 | 1 | ST2 |
| Q9 | 6 | 1 | ST3 |
| Q9 | 8 | 1 | ST4 |
| Q32 | OTC TRADED AGRO COMMODITY | 1 | SV1A |
| Q32 | NON-OTC TRADED AGRO COMMODITY | 1 | SV1A |
| Q32 | NON-AGRO COMMODITY | 1 | SV1A |
| Q32 | NON-COMMODITY | 1 | SV1A |
| Q32 | OTC TRADED AGRO COMMODITY | 1 | SV1B |
| Q32 | NON-OTC TRADED AGRO COMMODITY | 1 | SV1C |
| Q32 | NON-AGRO COMMODITY | 1 | SV1D |
| Q32 | NON-COMMODITY | 1 | SV1E |
| Q32 | OTC ANIMAL-BASED COMMODITY | 1 | SV1F |
| Q32 | NON OTC ANIMAL-BASED COMMODITY | 1 | SV1G |
| Q33 | < 1 YEAR | 1 | SV10A |
| Q33 | > 1 YEAR | 1 | SV10B |
| Q34 | SUPPLY > DEMAND | 1 | SV11A |
| Q34 | SUPPLY = DEMAND | 1 | SV11B |
| Q34 | SUPPLY < DEMAND | 1 | SV11C |
| Q35 | ONE | 1 | SV12A |
| Q35 | > 1 | 1 | SV12B |
| Q36 | LOW | 1 | SV13A |
| Q36 | MEDIUM | 1 | SV13B |
| Q36 | HIGH | 1 | SV13C |
| Q42 | HIGH | 0.5 | SV3 |
| Q42 | LOW | 0.5 | NULL |
| Q43 | HIGH | 0.5 | SV2 |
| Q43 | LOW | 0.5 | NULL |
| Q44 | HIGH | 0.5 | SV4 |
| Q44 | LOW | 0.5 | NULL |
| Q45 | SUPPLY > DEMAND | 0.5 | NULL |
| Q45 | SUPPLY = DEMAND | 0.5 | NULL |
| Q45 | SUPPLY < DEMAND | 0.5 | SV5 |
| Q46 | HIGH | 0.5 | SV7 |
| Q46 | LOW | 0.5 | NULL |
| Q47 | HIGH | 0.5 | SV9 |
| Q47 | LOW | 0.5 | NULL |
| Q48 | SUPPLY > DEMAND | 0.5 | SV6 |
| Q48 | SUPPLY = DEMAND | 0.5 | SV6 |
| Q48 | SUPPLY < DEMAND | 0.5 | SV8 |
| ∘∘∘ | ∘∘∘ | ∘∘∘ | ∘∘∘ |

FIG. 5E

| KNOWLEDGE ITEM GROUP IDENTIFIER | KNOWLEDGE ITEM IDENTIFIER | KNOWLEDGE ITEM | KNOWLEDGE ITEM WEIGHTING FACTOR |
|---|---|---|---|
| SV16 | I161 | MINIMIZE THE PURCHASE ORDER PROCESSING COSTS BY STREAMLINING/SIMPLIFYING THE PROCESSES | 2 |
| | I162 | LEVERAGE THE USE OF TECHNOLOGY (INTERNET, EDI) TO INTEGRATE SUPPLIERS INTO THE SYSTEM AND MINIMIZE BILLING INACCURACIES, AND INVOICING COSTS | 3 |
| | I163 | MINIMIZE PRODUCT HANDLING AND INVENTORY CARRYING COSTS BY IMPLEMENTING DOCK-TO-STOCK PULL SYSTEMS | 3 |
| | I164 | PURSUE OPPORTUNITIES OF CONSOLIDATED BUYING (CO-OP WITH KEY SUPPLIERS) TO LEVERAGE VOLUMES | 2 |
| SV17 | I171 | UNDERSTAND AND MANAGE THE "TOTAL COST OF OWNERSHIP" OF THE EQUIPMENT – PURCHASE PRICE, ACQUISITION COST, COST OF USE, PRODUCT LIFE, WARRANTY, ETC | 3 |
| | I172 | UNBUNDLE THE SUPPLY CHAIN COST ELEMENTS TO DETERMINE THE KEY COST DRIVERS AND MANAGE THEM PROACTIVELY | 3 |
| | I173 | MINIMIZE COSTS EARLY IN THE DESIGN PROCESS BY INVOLVING SUPPLIERS IN THE PRODUCT DEVELOPMENT PHASE | 2 |
| | I174 | WORK WITH SUPPLIERS AND R&D TO WEED OUT COSTS DUE TO "OVER-SPECS" AND NON-VALUE ADDED OPTIONS | 1 |
| | I175 | WORK WITH R&D TO STANDARDIZE THE EQUIPMENT ACROSS THE USER BASE | 2 |
| SV15 ... | I151 ... | WORK WITH SUPPLIERS TO DRIVE DOWN COSTS BY APPLYING TEAM'S KNOWLEDGE OF THE "LEARNING CURVE" BENEFITS | 3 ... |

| KNOWLEDGE ITEM IDENTIFIER 352 | ACCUMULATED WEIGHTING FACTOR 354 | BUFFER GROUP ID 356 | BUFFER WEIGHTING FACTOR 358 | TOTAL WEIGHTING FACTOR 360 |
|---|---|---|---|---|
| 300a | .8 | 1 | 1 | .8 |
| 300a | .8 | 2 | .5 | .4 |
| 300a | .8 | 2 | 1.5 | 1.2 |
| 300b | .9 | 2 | .7 | .63 |
| 300b | .9 | 3 | .9 | .81 |
| 300c | .7 | 1 | 1 | .7 |
| 300c | .7 | 2 | 1 | .7 |
| ⋮ | ⋮ | ⋮ | ⋮ | ⋮ |
| 300x | 1 | 1 | .7 | .7 |
| 300x | 1 | 3 | .5 | .5 |
| ∘ | ∘ | ∘ | ∘ | ∘ |

FIG. 9

| QUESTION IDENTIFIER | QUESTION DESCRIPTION | QUESTION STATUS | HISTORY | ANSWER TYPE | ANSWER LIST | TRIGGER LIST |
|---|---|---|---|---|---|---|
| Q1 | IS THE ITEM SPEND | I | R1<br>R1 | S | HIGH<br>LOW | Q3<br>Q2 |
| Q2 | IS THE ITEM CRITICAL | D | R2<br>R2 | S | YES<br>NO | S1<br>S2 |
| Q3 | ITEM CLASSIFICATION | D | R3<br>R3<br>R3<br>R3 | S | F&P<br>RESTAURANT SUPPLIES<br>OFFICE SUPPLIES<br>CAPITAL EQUIPMENT | Q4<br>S5<br>S3<br>S4 |
| Q4 | DOES THE PROPOSED IDEA | D | | S | REDUCE PRODUCT COST<br>IMPROVE SUPPLY CHAIN EFFICIENCIES | Q5<br>Q13 |
| Q5 | DOES THE PROPOSED IDEA REDUCE PRODUCT COST BY LOWERING | D | | S | RAW MATERIAL COST<br>PROCESSING COST<br>PACKAGING COSTS<br>PLANT OVERHEAD<br>CORPORATE OVERHEAD<br>LOGISTICS COST<br>SUPPLIER PROFIT MARGIN | Q6<br>Q7<br>S25<br>Q8<br>S32<br>S35<br>S34 |
| Q6 | DOES THE PROPOSED IDEAS REDUCE RAW MATERIAL COST BY | D | | S | VALUE ENGINEERING THE PRODUCT FORMULATION<br>REENGINEERING THE MANUFACTURING PROCESS<br>MANAGING THE RAW MATERIAL VERTICAL MARKETS<br>MITIGATING THE RAW MATERIAL PRICE VOLATILITY | Q9<br>Q10<br>Q9<br>Q11 |
| Q7 | DOES THE PROPOSED IDEA REDUCE PROCESSING COST BY | D | | S | IMPROVING CAPACITY UTILIZATION<br>LOWERING LABOR COSTS<br>IMPROVING PROCESS YIELDS | Q12<br>S26<br>S27 |
| ∘∘∘ | ∘∘∘ | ∘∘∘ | ∘∘∘ | ∘∘∘ | ∘∘∘ | ∘∘∘ |

| 520 | 522 | 524 | 526 | 528 | 530 | 532 | ... | 534 | 536 |
|---|---|---|---|---|---|---|---|---|---|
| DOCUMENT IDENTIFIER | RAW ANSWER MATCH – QUESTION GROUP 1 | QUESTION GROUP 1 WEIGHTING FACTOR | WEIGHTED ANSWER MATCH QUESTION GROUP 1 | RAW ANSWER MATCH – QUESTION GROUP 2 | QUESTION GROUP 2 WEIGHTING FACTOR | WEIGHTED ANSWER MATCH QUESTION GROUP 2 | ... | RAW TOTAL ANSWER MATCH | WEIGHTED TOTAL ANSWER MATCH |
| 542a | 15 | .8 | 12 | 9 | 1.5 | 13.5 | ... | 24 | 25.5 |
| 542b | 10 | .8 | 8 | 15 | 1.5 | 22.5 | ... | 25 | 30.5 |
| 542c | 5 | .8 | 4 | 12 | 1.5 | 18 | ... | 17 | 22 |
| 542d | 0 | .8 | 0 | 20 | 1.5 | 30 | ... | 20 | 30 |
| 542e | 18 | .8 | 14.4 | 7 | 1.5 | 10.5 | ... | 25 | 24.9 |
| 542f | 6 | .8 | 4.8 | 2 | 1.5 | 3 | ... | 8 | 7.8 |
| 542g | 12 | .8 | 9.6 | 10 | 1.5 | 15 | ... | 22 | 24.6 |
| ... | ... | ... | ... | ... | ... | ... | ... | ... | ... |

SYSTEM AND METHOD FOR PERFORMING A MINDFLOW PROCESS USING A MINDFLOW DOCUMENT ARCHIVE

CROSS-REFERENCE TO RELATED APPLICATIONS

This application is related to and filed concurrently with pending U.S. patent application Ser. No. 09/371,711, entitled "System and Method for Performing a Mindflow Process," and with pending U.S. patent application Ser. No. 09/371,145, entitled "System and Method for Processing Knowledge Items of a Knowledge Warehouse." These applications have been commonly assigned to R3 Systems, Inc.

TECHNICAL FIELD OF THE INVENTION

This invention relates in general to knowledge management systems, and more particularly to performing a mindflow process using a mindflow document archive.

BACKGROUND OF THE INVENTION

Businesses rely upon technology to communicate and share information in an effort to increase transactional productivity. As corporations evolve, they become more reliant on technology to automate manual processes. For example, corporations may use document management techniques to organize and maintain the integrity of information, and groupware software to sequence the flow of the information from one person to another across a network. Furthermore, corporations may use workflow technologies to manage the movement of the information as it flows through the sequence of steps that make up a work procedure, such as the steps needed to automate expense reimbursement procedures.

In the emerging electronic business environment, employer-employee loyalty in corporations is lacking, resulting in higher workforce turnover. As a result, corporations are losing their "expert" decision-makers who are the analytical driving force behind successful business processes. Furthermore, companies must also address the challenges of employee training and accountability with respect to the performance of analytical business processes. Unfortunately, transaction-based technologies that simply support communicating information among various workers in a corporation to automate transactional tasks, such as many document management, groupware, and workflow technologies, do not add to the analytical productivity of an organization.

SUMMARY OF THE INVENTION

In accordance with the present invention, a system for performing a mindflow process using a mindflow document archive is provided which substantially eliminates or reduces disadvantages and problems associated with previous knowledge management systems.

In accordance with one embodiment of the present invention, a system for retrieving documents includes a memory coupled to a processor. The memory stores a number of documents. Each document comprises a number of first answers to a first group of questions and a number of second answers to a second group of questions. The processor presents to a knowledge worker the first group of questions and the second group of questions. The processor further retrieves from the memory those documents having a predetermined number of first answers matching the answers of the knowledge worker to the first group of questions and a predetermined number of second answers matching the answers of the knowledge worker to the second group of questions.

Another embodiment of the present invention is a method for retrieving documents. The method includes storing a number of documents, each document comprising a number of first answers to first group of questions and a number of second answers to a second group of questions. The method continues by presenting to a knowledge worker the first group of questions and the second group of questions. The method concludes by retrieving from the memory those documents having a predetermined number of first answers matching the answers of the knowledge worker to the first group of questions and a predetermined number of second answers matching the answers of the knowledge worker to the second group of questions.

Technical advantages of the present invention include a system for performing a process that models the mindflow of "expert" knowledge workers performing various business processes to provide analytical decision-making support to "novice" knowledge workers within an organization. The system includes a number of modules and databases that are executed to support the mindflow management activities of the system. A mindflow management module includes one or more knowledge modules. Each knowledge module comprises a process that performs a particular business task. Each process comprises a number of subprocesses arranged according to a business model. The mindflow management module is coupled to a knowledge items warehouse that maintains current strategies, ideas, solutions, and any other knowledge items used by knowledge workers to make strategic business decisions.

A knowledge item retrieval module operates to perform an interactive query session with a knowledge worker. Based upon the results of the query session, the knowledge item retrieval module retrieves knowledge items from the knowledge items warehouse for communication to a buffer module. The buffer module selects a portion of the retrieved knowledge items according to various business criteria, and presents to the knowledge worker the most relevant knowledge items applicable to a broad array of decision-making opportunities facing the knowledge worker. A particular advantage provided by the present invention is that the knowledge worker may utilize the knowledge items to perform one or more subprocesses associated with a selected knowledge module.

Another technical advantage of the present invention includes a knowledge item accumulation module that operates to perform a query session with a knowledge worker in order to store in the knowledge items warehouse those knowledge items generated by a knowledge worker. The knowledge items generally represent strategies, ideas, and solutions developed by a knowledge worker making business decisions during the execution of a particular knowledge module. In this respect, the knowledge items warehouse comprises an active knowledge warehouse that is updated to raise the business IQ of an organization.

Further technical advantages of the present invention include a mindflow document that includes information detailing the execution of various business tasks associated with a particular knowledge module by a knowledge worker. For example, a mindflow document includes information detailing the execution of each subprocess of a knowledge module, such as information detailing a query session performed by the knowledge worker to retrieve knowledge items. In this respect, a mindflow document captures the analytical thought processes and decision-making activities of knowledge workers performing the business tasks or accomplishing the business objectives of an organization.

Further advantages of the present invention include a mindflow document archive that stores mindflow documents according to any suitable number and combination of identifiers of an associated business task or objective. A mindflow document retrieval module operates to retrieve relevant mindflow documents from the mindflow document archive for presentation to a knowledge worker. In this respect a knowledge worker may retrieve and examine mindflow documents to learn about the decision-making activities of previous knowledge workers facing similar business issues so that the knowledge worker may make informed business decisions. In this respect, a "novice" knowledge worker may gain insight from the experiences of prior knowledge workers performing a similar business process.

Further technical advantages of the present invention include a system administration module that operates to conduct a review session of knowledge items stored in the knowledge items warehouse. During the review session, a system administrator reviews each knowledge item in the knowledge items warehouse that is generated by a knowledge worker. The system administrator may remove a knowledge item from the knowledge items warehouse or modify the indexing or weighting schemes of a knowledge item based upon a variety of criteria directed to the frequency and type of use of the knowledge item and the qualitative and quantitative impact of a knowledge item on a business task. In this respect, a system administrator may maintain the integrity of the knowledge items in the knowledge items warehouse.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIGS. 3A–3K illustrate exemplary displays of a graphical user interface supported by the system;

FIGS. 5A–5G illustrate exemplary information used by the knowledge item retrieval module;

FIG. 9 illustrates exemplary information used by the knowledge item accumulation module;

FIG. 11 illustrates exemplary information used by the mindflow document retrieval module;

DETAILED DESCRIPTION OF THE INVENTION

Figure 1:
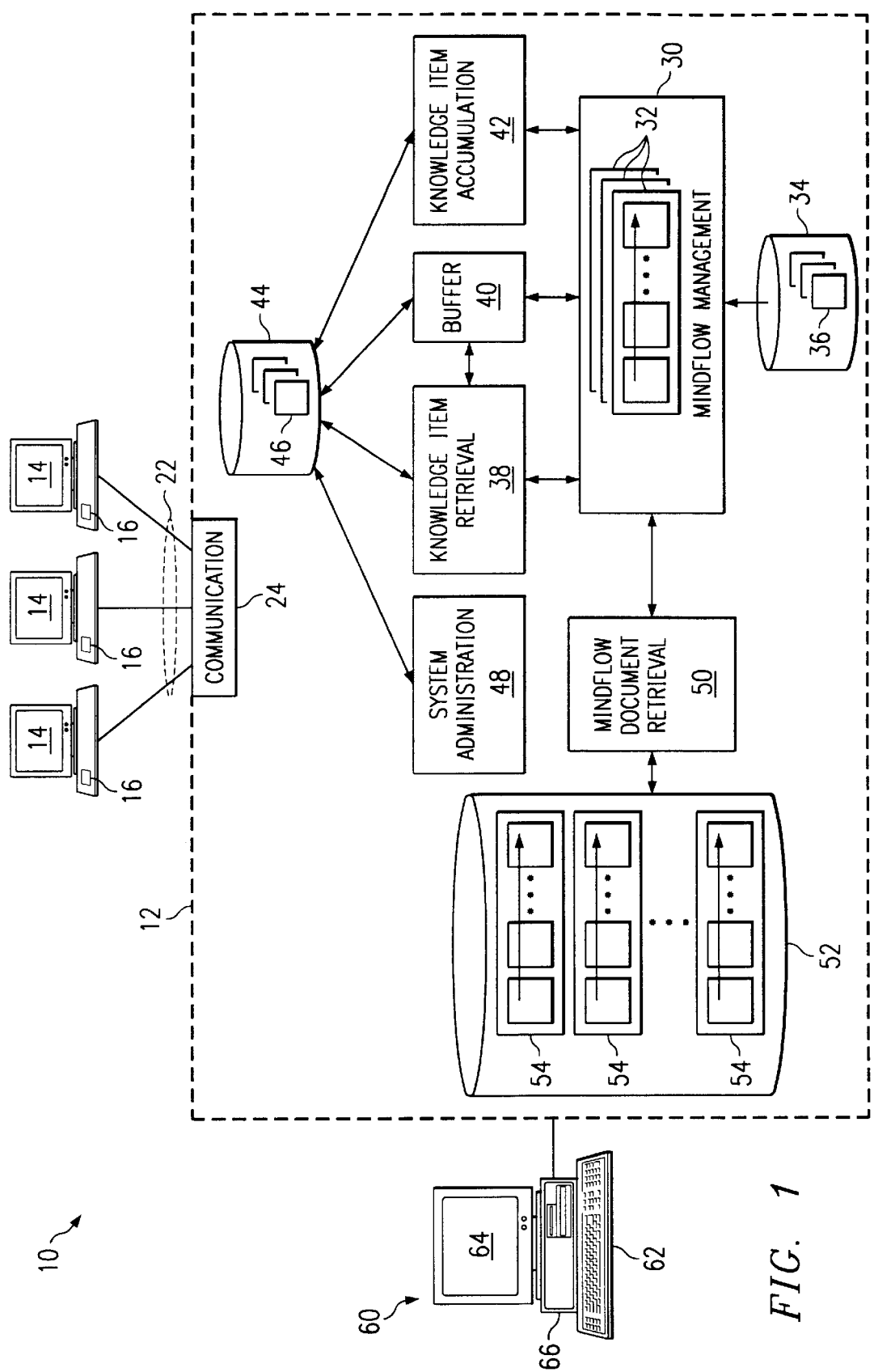
FIG. 1 illustrates a system for performing a mindflow process according to the present invention.

FIG. 1 illustrates a system 10 for performing a mindflow process according to the present invention. Generally, a mindflow traces the analytical decision-making aspects of a knowledge worker performing a business process. In general, system 10 models the mindflow of "expert" knowledge workers performing various business processes to provide analytical support to "novice" knowledge workers within an organization. In this respect, system 10 institutionalizes the strategies, ideas, solutions, business tools, and analytical processes within an organization and thereby raises the business IQ of an organization to a higher level.

System 10 includes a server 12 coupled to a variety of clients 14 referred to generally in the singular as client 14 or in the plural as clients 14. Clients 14 comprise computers, workstations, or any other suitable processing devices that include the appropriate hardware and software capabilities to execute mindflow management application 16 using server 12. Mindflow management application 16 generally provides knowledge-based decision support services to knowledge workers operating clients 14. Clients 14 are typically operated by knowledge workers of a particular organization or field of business associated with the underlying subject matter of the mindflow system 10. A knowledge worker comprises any suitable operator of system 10 and typically represents a decision-maker in an organization, such as an associate, manager, executive, or administrator.

Clients 14 communicate with server 12 using hardware and software associated with link 22. For example, clients 14 couple to server 12 using communication devices that may include any combination of hubs, routers, bridges, gateways, firewalls, switches, remote access devices, or any other association of suitable communication devices and related software that facilitate communication between clients 14 and server 12 using a link 22.

Link 22 may be a dedicated or switched link over the public switched telephone network (PSTN), a satellite link, a microwave link, or other appropriate communication link between clients 14 and server 12. The components of system 10 may be part of a local area network (LAN), wide area network (WAN), virtual private network (VPN), or any other suitable network of interconnected computing devices. In a particular embodiment, components in system 10 communicate over the Internet using the World Wide Web (WWW), file transfer protocol (FTP), Telnet, Usenet, Gopher or Archie utility, electronic mail, bulletin boards, or other communication technique. For example, server 12 and clients 14 may maintain and execute a browser or other suitable program for accessing and communicating information addressed by a uniform resource locator (URL) using link 22.

Although server 12 and clients 14 are referred to in the nomenclature of a client/server environment, it should be understood that server 12 and clients 14 may be any type of computer operating in any suitable environment that communicates using communication link 22. For example, the components in system 10 may be arranged in a peer-to-peer computing environment.

Server 12 includes a number of modules and databases that are executed by application 16 to support the mindflow management activities of system 10. A communication module 24 coupled to communication link 22 supports communication between client 14 and the various components of server 12. A mindflow management module 30 includes knowledge modules 32. Each knowledge module 32 comprises a process that performs a particular business task. Each process comprises a plurality of subprocesses arranged according to a business model that may be developed, in one embodiment, according to input gathered from a variety of sources, such as experts in the relevant field of the business task, experts within a particular organization for which system 10 is implemented, and any other source of business information and knowledge. Examples of knowledge modules 32 include a cost-savings module, a sourcing-strategy module, a resource-planning module, an account-management module, and a product development module. Module 30 executes a particular knowledge module 32 selected by a knowledge worker to perform the associated business task. To execute a particular knowledge module 32, module 30 may coordinate the operation of other modules of server 12.

Data warehouse 34 is coupled to mindflow management module 30 and comprises a repository for data items 36. Data items 36 comprise information associated with the knowledge workers of system 10, such as profile information for the knowledge workers (e.g., department, security information, and access level information). Data items 36 also comprise information regarding the relevant field of business of the organization to which a knowledge worker belongs. This type of information may include product profile information for the organization (e.g., product description, price, volume, etc.); business tools and software used by the organization (e.g., spreadsheet tools, word-processing tools, optimization tools, report-generating tools, and any other self-executing program code); and any other fundamental information regarding the organization of the knowledge workers.

A knowledge item retrieval module 38, a buffer module 40, and a knowledge item accumulation module 42 each couple a knowledge items warehouse 44 to mindflow management module 30. Knowledge items warehouse 44 comprises a dynamic data warehouse that maintains knowledge items 46. A knowledge item 46 comprises any strategy, idea, solution, or any other suitable piece of information used by knowledge workers to make business decisions. Typically, warehouse 44 includes knowledge items 46 that are standardized for a particular organization so that system 10 raises the business IQ of an organization to a common level and supports the consistent execution of business processes within the organization.

Knowledge item retrieval module 38 performs an interactive query session with a knowledge worker. A query session generally includes any number and combination of questions presented by module 38 for the selected knowledge module 32, and corresponding answers provided by the knowledge worker in response. Based upon the results of the query session, knowledge item retrieval module 38 retrieves knowledge items 46 for communication to buffer module 40. The knowledge items 46 retrieved by module 38 generally provide ideas, solutions, or strategies that may be implemented in the selected knowledge module 32.

Buffer module 40 presents to the knowledge worker a portion of the retrieved knowledge items 46 selected according to weighting factors associated with the questions presented to the knowledge worker during the query session, the answers provided by the knowledge worker, and knowledge items 46. In this respect, buffer module 40 presents to the knowledge worker the most relevant knowledge items 46 applicable to a broad array of decision-making opportunities facing the knowledge worker. A knowledge worker may utilize knowledge items 46 to perform one or more subprocesses associated with the selected knowledge module 32 of mindflow management module 30.

Knowledge accumulation module 42 also performs an interactive query session with a knowledge worker. Based upon the results of this query session, module 42 stores in warehouse 44 knowledge items 46 generated by the knowledge worker. These knowledge items 46 generally represent those strategies, ideas, and solutions developed by a knowledge worker making business decisions during the execution of a knowledge module 32. Because these knowledge items 46 were typically implemented by a knowledge worker in one or more knowledge modules 32 with a measure of success, by storing the knowledge items 46 in warehouse 44 future knowledge workers may also implement them with success in one or more knowledge modules 32. In this respect, knowledge items warehouse 44 comprises an active knowledge warehouse that is updated to raise the business IQ of an organization.

A knowledge item 46 generated by a knowledge worker is stored in warehouse 44 with a flag, pointer, or any other suitable form of identification associated with status information for knowledge item 46. For example, the flag may indicate that the knowledge item 46 was generated by a knowledge worker and may link to status information for the knowledge item 46. The status information may indicate the period of time that the knowledge item 46 has been stored in the warehouse 44; the frequency of use of the knowledge item 46 by a knowledge worker executing a knowledge module 32; the results of implementing the knowledge item 46 in a knowledge module 32; the last time and the number of times the knowledge item 46 was reviewed by a system administrator; or any other information indicating the history of the knowledge item 46.

System administration module 48 operates to conduct a review session with a system administrator. During the review session, the system administrator reviews each knowledge item 46 identified by a flag and determines the integrity of the knowledge items 46 to maintain the integrity of warehouse 44. In particular, a system administrator may remove a knowledge item 46 from warehouse 44 or modify the indexing or weighting schemes of a knowledge item 46 based upon a variety of criteria directed to the frequency and type of use of the knowledge item 46 and the qualitative and quantitative impact of a knowledge item 46 on a business task. Furthermore, the system administrator may issue a recommendation directing knowledge workers how best to use a particular knowledge item 46 based upon its status information. For example, the system administrator may recommend implementing a particular knowledge item 46 in one or more knowledge modules 32.

Mindflow document retrieval module 50 couples a mindflow document archive 52 to mindflow management module 30. Mindflow document archive 52 includes mindflow documents 54. A mindflow document 54 comprises a file, a record, a catalog, or any other suitable arrangement of information that details the execution of a knowledge module 32 by a knowledge worker. A document 54 generally details the analytical thought processes of a knowledge worker that previously performed one or more business tasks associated with a knowledge module 32. For example, a document 54 comprises information detailing the execution of each subprocess of a knowledge module 32, including any query sessions performed by a knowledge worker of system 10. Archive 52 stores documents 54 according to the business issues confronted by a knowledge worker, the decisions made by a knowledge worker, a query session stored in documents 54, the subject matter of an associated knowledge module 32, and/or any other suitable number and combination of identifiers of an associated business task or objective that may be used by module 50 to retrieve relevant documents 54 for presentation to knowledge workers.

A mindflow document retrieval module 50 retrieves relevant documents 54 for presentation to a knowledge worker. Module 50 generally associates the characteristics of a knowledge module 32 operated by a knowledge worker with one or more identifiers associated with documents 54 to determine which documents 54 are relevant to the current knowledge worker. In one embodiment, module 50 compares the results of a query session performed by a current knowledge worker with the results of a query session detailed in a document 54 to determine whether a particular document 54 is relevant. A knowledge worker generally examines the retrieved documents 54 to learn about the decision-making activities of previous knowledge workers facing similar business issues so that the knowledge worker may make informed decisions while executing a current knowledge module 32. In this respect, a "novice" knowledge worker may gain insight from the experiences of prior knowledge workers performing a similar business process.

Server 12 and clients 14 may operate on one or more computers, such as computer 60 associated with server 12. Each computer 60 includes an input device 62 such as a keypad, touch screen, mouse, or other device that can accept information. Output device 64 conveys information associated with the operation of server 12 or clients 14, including digital data, visual information, or audio information. Both input device 62 and output device 64 may include fixed or removable storage media such as a magnetic computer disk, CD-ROM, or other suitable media to both receive output from and provide input to server 12 and clients 14. Processor 66 and its associated memory comprise a central processing unit associated with an operating system that executes instructions and manipulates information in accordance with the operation of system 10.

Computer 60 associated with server 12 maintains and executes the instructions to implement mindflow management application 16, including communication module 24, mindflow management module 30, knowledge item retrieval module 38, buffer module 40, knowledge item accumulation module 42, system administration module 48, and mindflow document retrieval module 50. Each module described above with reference to server 12 and client 14 comprises any suitable combination of hardware and software in computer 60 to provide the described function or operation of the module. For example, modules may include program instructions and associated memory and processing components to execute the program instructions. Also, modules illustrated in FIG. 1 may be separate from or integral to other modules.

Data items database 34, knowledge items warehouse 44, and mindflow document archive 52 on server 12 may comprise one or more files, lists, tables, or other arrangement of information stored in one or more components of random access memory (RAM), read only memory (ROM), magnetic computer disk, CD-ROM, other magnetic or optical storage media, or any other volatile or non-volatile memory devices. Although FIG. 1 illustrates most memory devices as internal to server 12, it should be understood that the memory devices may be internal or external to components of system 10, depending on the particular implementation. Also, memory devices illustrated in FIG. 1 may be separate or integral to other memory devices.

In operation, system 10 manages the mindflow of a knowledge worker performing a business task. To perform a business task using system 10, a knowledge worker operating a client 14 executes a selected knowledge module 32. Each knowledge module 32 comprises a process that performs a particular business task. Although the following operation of system 10 is described with reference to a knowledge worker executing a cost-savings knowledge module 32, it should be understood that system 10 includes a knowledge module 32 to perform any suitable business task of an organization. Client 14 communicates the knowledge worker's selection using communication link 22, which is received by server 12 at communication module 24. Mindflow management module 30 executes the knowledge module 32 selected by the knowledge worker.

The process of each knowledge module 32 comprises a plurality of subprocesses arranged according to a business model. For example, a cost-savings knowledge module 32 includes subprocesses designed to collect information from the knowledge worker; analyze the collected information to identify potential cost-savings opportunities for the organization of the knowledge worker; determine the feasibility of and evaluate the identified cost-savings opportunities; and implement selected cost-savings opportunities in the cost-savings module 32 using selected business tools. Other knowledge modules 32 that execute to perform other business tasks may include the same or different subprocesses as the cost-savings knowledge module 32, arranged according to a business model associated with the particular business task. For example, a sourcing-strategy knowledge module 32 includes subprocesses designed to collect information from the knowledge worker; analyze the collected information to understand customer strategy; identify sourcing criterion; identify potential sourcing strategies; rate the strategies against the sourcing criterion and evaluate the strategy risks; and execute a selected sourcing strategy using selected business tools.

Mindflow management module 30 operates with knowledge item retrieval module 38, buffer module 40, and knowledge items warehouse 44 to execute the subprocesses of the cost-savings knowledge module 32 directed to collecting and analyzing information to identify potential cost-savings opportunities. In particular, module 38 performs an interactive query session with the knowledge worker using a graphical user interface presented to the knowledge worker. The query session is described in greater detail with reference to FIGS. 4 and 5. In general, knowledge item retrieval module 38 presents to the knowledge worker various questions directed to the subject matter of the selected knowledge module 32. Module 38 retrieves knowledge items 46 from knowledge items warehouse 44 based upon the results of the query session. In this example, the knowledge items 46 retrieved by module 38 from warehouse 44 may comprise potential cost-savings opportunities for the organization of the knowledge worker.

Mindflow management module 30 operates with buffer module 40 to select a portion of the retrieved knowledge items 46 for presentation to the knowledge worker. In general, module 40 selects knowledge items 46 retrieved by module 38 according to weighting factors associated with the questions presented to the knowledge worker during the query session, the answers provided by the knowledge worker, and the knowledge items 46. In this respect, module 40 presents the most relevant cost-savings opportunities to the knowledge worker.

In addition to retrieving knowledge items 46 in the form of potential cost-savings opportunities, mindflow management module 30 operates with mindflow document retrieval module 50 to retrieve selected documents 54 for presentation to the knowledge worker. Mindflow documents 54 detail the analytical thought-processes of knowledge workers that previously performed business tasks associated with knowledge modules 32. In this example, module 50 retrieves those documents 54 most relevant to the cost-savings issues faced by the knowledge worker, as determined by the query session. For example, a document 54 retrieved by module 50 may comprise information detailing the performance of each subprocess of a cost-savings knowledge module 32 executed by a previous knowledge worker, including any query sessions between the previous knowledge worker and module 38. Because archive 52 stores documents 54 according to identifiers associated with the business tasks or objectives of knowledge modules 32, module 50 may intelligently retrieve relevant documents 54.

In one embodiment, module 50 determines a relevancy between documents 54 stored in archive 52 and the knowledge module 32 being executed by the knowledge worker based upon the results of the query sessions detailed in documents 54 and a query session between the knowledge worker and module 38. A query session between a knowledge worker and module 38 may include any number of groups of questions, such as a first group of questions to which the knowledge worker provides a first group of answers, and a second group of questions to which the knowledge worker provides a second group of answers. The first group of questions may include questions regarding a first subject of the business task associated with the selected knowledge module 32. The second group of questions may include questions regarding a second subject of the business task.

Module 50 may retrieve from archive 52 those documents 54 having a predetermined number of answers matching the answers of the knowledge worker for one or more of the groups of questions. For example, module 50 may retrieve a particular document 54 from archive 52 if at least ten answers in the document 54 match the answers provided by the knowledge worker to a first group of questions, and at least twenty answers in the document 54 match the answers provided by the knowledge worker to a second group of questions. Because each group of questions presented to the knowledge worker during a query session is directed to a particular subject of the selected knowledge module 32, module 50 retrieves those documents 54 most relevant to the selected knowledge module 32 by matching a predetermined number of answers among each of the different groups of questions.

In a particular embodiment, module 50 ranks the different groups of questions presented during a query session according to question weighting factors stored in data warehouse 34, and retrieves documents 54 from archive 52 according to the ranking of the questions. Therefore, if the first group of questions is directed to an aspect of the selected knowledge module 32 that is deemed to be more important to the knowledge worker based upon the question weighting factors than another aspect of the selected knowledge module 32 associated with the second group of questions, then module 50 may rank the first group of questions higher than the second group of questions. Module 50 then retrieves documents 54 from archive 52 according to the determined ranking of the questions.

For example, module 50 may retrieve selected documents 54 based upon a function of the waiting factors of the questions presented during a query session and the raw number of answers in document 54 matching the answers of the knowledge worker to any particular group of questions, as described in greater detail with respect with reference to FIG. 11. A particular advantage provided by this aspect of the present invention is that even if the raw number of answers in a document 54 matching the answers of the knowledge worker is not sufficient to meet the predetermined limits for the particular question group, the waiting factors for the questions in the question group may indicate that the particular question group is important relative to other question groups so that module 50 may still retrieve the document 54.

In yet another embodiment, module 50 may retrieve from archive 52 those documents 54 having a predetermined total number of answers matching the answers provided by the knowledge worker, regardless of the grouping of the questions. For example, module 50 may retrieve a document 54 even if the document 54 fails to match a predetermined number of answers among each of the different groups of questions if the document 54 includes a predetermined total number of answers matching the answers of the knowledge worker. Module 50 may also rank according to this method those documents 54 retrieved according to another method.

To determine the feasibility of the identified potential cost-savings opportunities, mindflow management module 30 distributes the retrieved knowledge items 46 to management knowledge workers operating a client 14, such as management executives within the organization of the knowledge worker, using communication device 24 and links 22. Management knowledge workers may approve or disapprove of the use of each potential cost-savings opportunity in the execution of the cost-savings knowledge module 32. A knowledge worker may develop additional cost-savings opportunities based upon the retrieved knowledge items 46, information stored in retrieved documents 54, or based upon prior experience in executing the cost-savings knowledge module 32. These knowledge items 46 developed by the knowledge worker may also be presented to a management knowledge worker for review.

A knowledge worker may evaluate particular knowledge items 46, such as those approved by the management knowledge workers, to determine which potential cost-savings opportunity will be implemented for the remainder of the cost-savings knowledge module 32. To aid the knowledge worker to evaluate knowledge items 46, mindflow management module 30 determines a number of relevant parameters associated with the selected knowledge module 32 and assigns a weighting factor to each parameter. It should be understood that any number and combination of parameters associated with the selected knowledge module 32 may be used to evaluate the knowledge items 46. Examples of parameters associated with the cost-savings knowledge module 32 may include the estimated savings of the cost-savings opportunity, the research and development resources to be spent on the cost-savings opportunity, and the time required to implement the cost-savings opportunity.

Module 30 assigns a weight to each parameter based upon the relevance of each parameter to the business task of the selected knowledge module 32. Module 30 then determines a prioritization of the parameters for each knowledge item 46 based upon input of the knowledge worker. Next, module 30 determines a value index for each knowledge item 46. The value index may comprise a function of the weighting factor of each parameter and the prioritization of the parameters. A knowledge worker may select one or more cost-savings opportunities to implement in the execution of the cost-savings knowledge module 32 based upon the value index determined for each knowledge item 46.

Module 30 determines a number of business tools to be operated by the knowledge worker to execute the selected knowledge module 32 based upon the knowledge items 46 selected by the knowledge worker. For example, module 30 may select one or more particular spreadsheet applications, word-processing applications, optimization applications, or any other suitable software applications operated by the knowledge worker to execute the cost-savings knowledge module 32 based upon the cost-savings opportunities selected by the knowledge worker.

In one embodiment, the knowledge worker may implement the selected knowledge module 32 using a knowledge item 46 developed by the knowledge worker, generally referred to as a new knowledge item 46. For example, the knowledge worker may develop a new knowledge item 46, such as a new cost-savings opportunity to implement in the cost-savings knowledge module 32. If the execution of the selected knowledge module 32 is successful using the new knowledge item 32, as measured by various cost-savings parameters for the cost-savings knowledge module 32, then the knowledge worker may operate knowledge item accumulation module 42 to store the new knowledge item 46 in knowledge items warehouse 44. In particular, knowledge item accumulation module 42 performs a second query session with the knowledge worker, and stores the new knowledge item 46 in warehouse 44 indexed according to the results of the second query session. Module 42 maps the new knowledge item 46 into warehouse 44 such that the knowledge item 46 may be later retrieved by knowledge item retrieval module 38 as described above. In this respect, knowledge items warehouse 44 comprises an active knowledge warehouse that is updated to raise the business IQ of an organization.

Knowledge item accumulation module 42 may assign a weighting factor to the new knowledge item 46 based upon quantifiers identifying the success of the selected knowledge module 32 using the new knowledge item 46. For example, module 42 may determine a weighting factor for a new cost-savings opportunity based upon the dollar cost-savings for the organization resulting from the execution of the cost-savings knowledge module 32 using the new cost-savings opportunity.

System administration module 48 operates with a system administrator operating a client 14 to conduct a review session of new knowledge items 46 stored in warehouse 44. During the review session, the system administrator reviews each new knowledge item 46, which may be identified by a flag, and determines the integrity of the new knowledge item 46 based upon status information indicating the frequency and type of use of the new knowledge item 46, and the qualitative and quantitative impact of the new knowledge item 46 on various business tasks performed by other knowledge workers using knowledge modules 32. In this regard, a system administrator may remove a new knowledge item 46 from warehouse 44; and/or modify the text, the weighting factor, or the indexing scheme of a new knowledge item 46 based upon status information quantifying the impact of the new knowledge item 46. By removing unsuccessful knowledge items 46, recommending the use of successful knowledge items 46, and modifying the weighting factors and indexing of knowledge items 46 stored in warehouse 44, a system administrator maintains the integrity of knowledge items warehouse 44.

Figure 2:
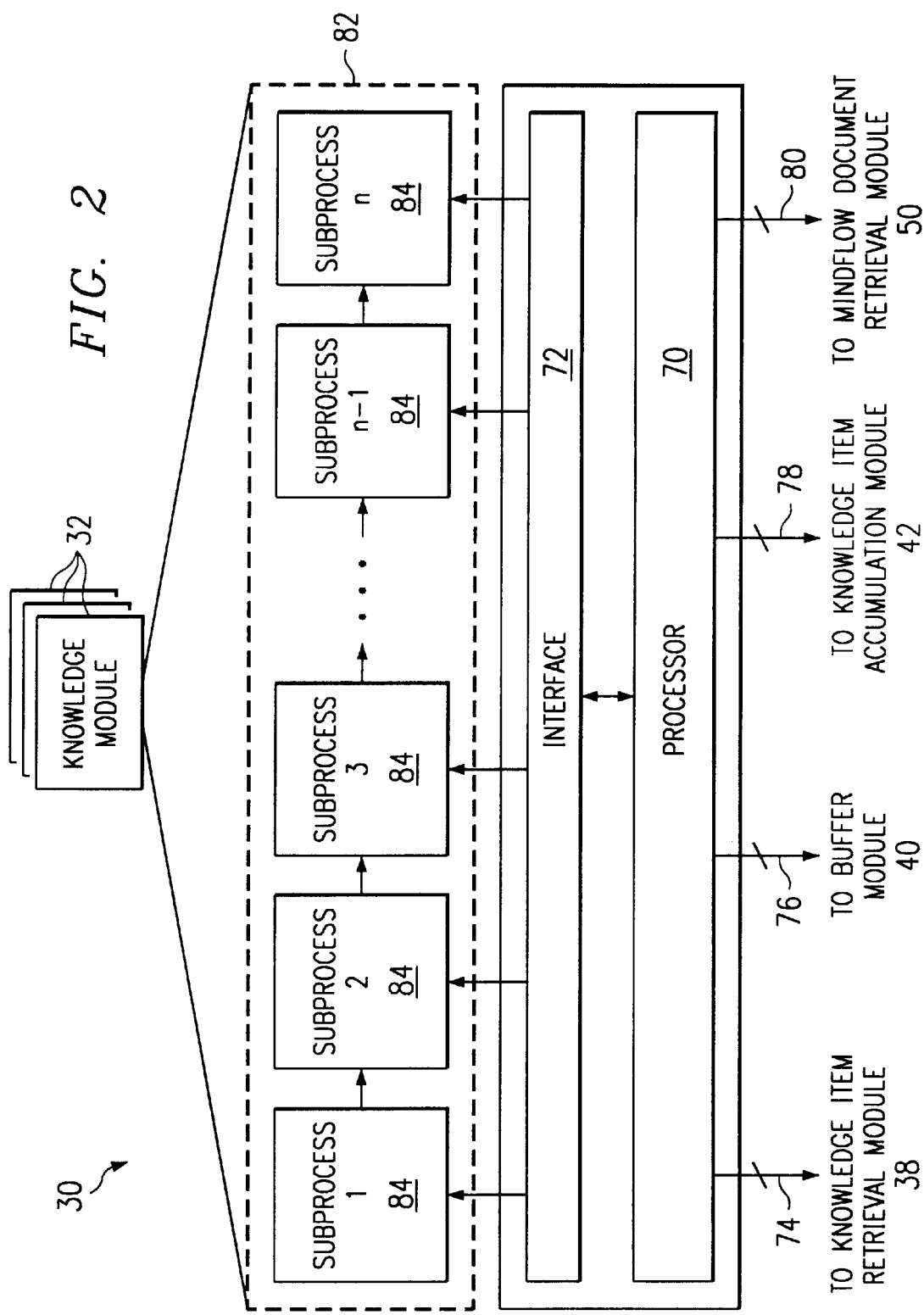
FIG. 2 illustrates one embodiment of a mindflow management module of the system.

FIG. 2 illustrates one embodiment of a mindflow management module 30 of system 10. Mindflow management module 30 includes a processor 70 and an interface 72. Processor 70 couples to module 38 using a link 74, module 40 using a link 76, module 42 using a link 78, and module 50 using a link 80. In general, processor 70 executes a knowledge module 32 selected by a knowledge worker to perform a business task.

Processor 70 of module 30 comprises any suitable combination of hardware and software in computer 60 to provide the described function or operation of module 30. For example, processor 70 may include program instructions and associated memory and processing components to execute the program instructions. Processor 70 may be separate from or integral to processor 66 or processors of other modules of system 10.

Interface 72 comprises one or more graphical user interfaces (GUIs) supported by mindflow management application 16 and presented to a knowledge worker operating a client 14 using a display 64. In general, GUI 72 facilitates communicating data between knowledge workers operating clients 14 and server 12 using links 22. A GUI 72 may comprise a plurality of displays having fields and buttons operated by a knowledge worker. It should be understood that the term graphical user interface may be used in the singular or in the plural to describe one or more graphical user interfaces and each of the displays of a particular graphical user interface.

Links 74–80 comprise any suitable communication paths between the specified components of system 10. A knowledge module 32 comprises a process 82 that performs a particular business task. Each process 82 comprises any number of subprocesses 84 arranged according to a business model for the particular business task. Examples of knowledge modules 32 include, but are not limited to, a cost-savings module, a sourcing-strategy module, a resource-planning module, an account-management module and a product-development module. It should be understood that system 10 may include a knowledge module 32 to perform any suitable business task of an organization.

In operation, module 30 executes a particular knowledge module 32 selected by a knowledge worker to perform the associated business task. Module 30 manages the mindflow of the knowledge worker performing the business task of the selected knowledge module 32 using GUI 72. In particular, processor 70 initiates a number of displays of GUI 72 operated by the knowledge worker to perform each of the subprocesses 84 of the selected knowledge module 32.

The following operation of module 30 is described with reference to a cost-savings knowledge module 32 selected by the knowledge worker. A cost-savings knowledge module 32 includes subprocesses 84 designed to collect information from the knowledge worker; analyze the collected information to identify potential cost-savings opportunities for the organization of the knowledge worker; determine the feasibility of and evaluate the identified cost-savings opportunities; accumulate cost-savings opportunities developed by the knowledge worker; and execute selected cost-savings opportunities using selected business tools. Processor 70 initiates the displays of GUI 72 operated by the knowledge worker to execute subprocesses 84 of the cost-savings knowledge module 32. These displays are described in more detail with reference to FIGS. 3A–3K. In particular, the displays of GUI 72 operated by the knowledge worker to log into system 10 and to select a knowledge module 32 are described with reference to FIGS. 3A–3D.

The displays of GUI 72 operated by the knowledge worker to execute the subprocesses 84 designed to collect information from the knowledge worker are described with reference to FIGS. 3E–3F. The displays of GUI 72 operated by the knowledge worker to execute subprocesses 84 designed to identify potential cost-savings opportunities for the organization of the knowledge worker and to determine the feasibility of the identified cost-savings opportunities are described with reference to FIG. 3G. The displays of GUI 72 operated by the knowledge worker to execute the subprocesses 84 designed to evaluate the identified cost-savings opportunities are described with reference to FIGS. 3H–3I. The displays of GUI 72 operated by the knowledge worker to execute the subprocesses 84 designed to accumulate new knowledge items 46 from the knowledge worker, such as new cost-savings opportunities developed by the knowledge worker, are described with reference to FIGS. 3J–3K.

Figure 3B:
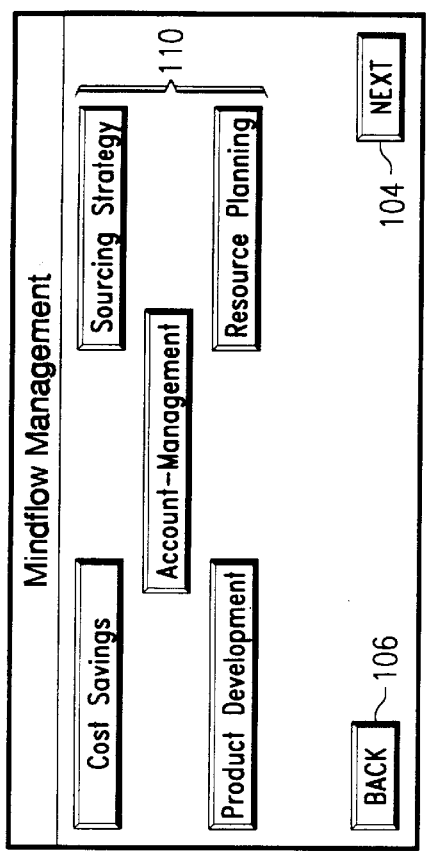
Figure 3A:
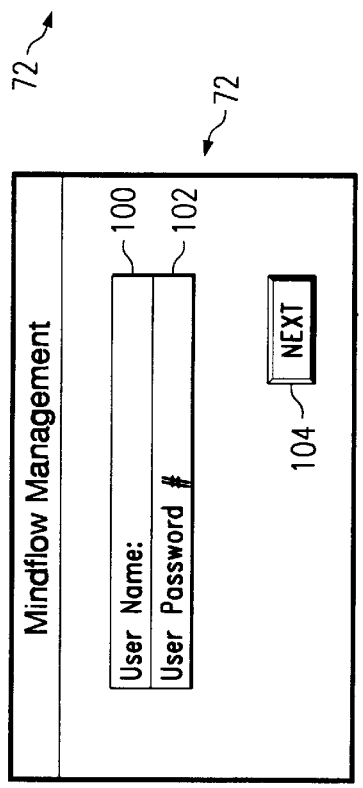

FIG. 3A illustrates one display of GUI 72 that provides an easy-to-use interactive interface for a knowledge worker operating client 14 to implement mindflow management application 16. GUI 72 includes a user-name field 100 and a user-password field 102. Processor 70 verifies the user name and user password of the knowledge worker using a security database stored as a data item 36 of data warehouse 34. In this respect, module 30 provides security for entry into system 10. GUI 72 further includes a Next button 104 operated by the knowledge worker to browse through the various displays of GUI 72.

FIG. 3B illustrates one display of GUI 72 that includes knowledge module options 110 for the knowledge worker to select a particular knowledge module 32. Although options 110 illustrated in FIG. 3B include Cost-Savings, Sourcing-Strategy, Account-Management, Product-Development, and Resource-Planning modules, it should be understood that system 10 is not limited to these options 110 and may include knowledge modules 32 to perform any suitable business task of an organization. GUI 72 further includes Back button 106 operated by the knowledge worker to browse the various displays of GUI 72. The knowledge worker selects a particular knowledge module 32 from Options 110, such as a cost-savings knowledge module 32. FIGS. 3C–3K include displays of GUI 72 associated with cost-savings knowledge module 32.

Figure 3C:
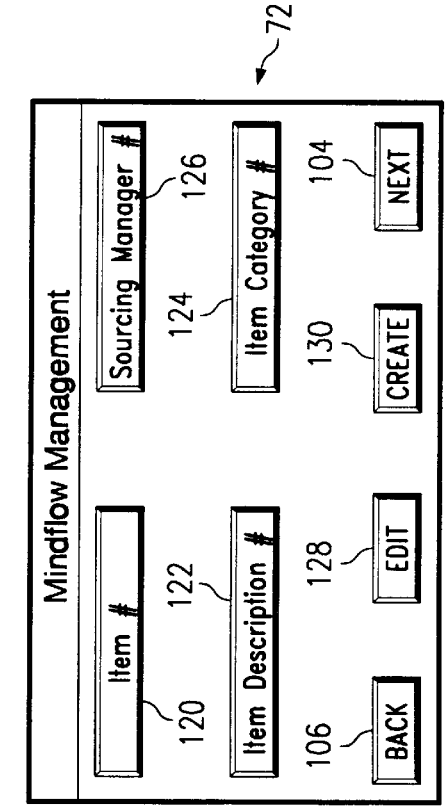

FIG. 3C illustrates one embodiment of GUI 72 that includes an item field 120, an item description field 122, an item category field 124, and a manager field 126. The knowledge worker operates fields 120–124 to identify a particular product, commodity, merchandise, or any other suitable item of the organization that will be the subject matter of cost-savings knowledge module 32. The knowledge worker operates manager field 126 to identify a manager, such as a sourcing manager, responsible for the item identified by fields 120–124.

Module 30 stores information detailing the execution of a knowledge module 32 by a knowledge worker in an associated mindflow document 54. While the execution of the knowledge module 32 is incomplete, the information is stored in a "working" mindflow document 54. Upon complete execution of a knowledge module 32, the working document 54 is stored in archive 52 as an "archive" mindflow document 54. GUI 72 further includes an Edit button 128 operated by a knowledge worker to open a working document 54 associated with the identified item and the selected knowledge module 32. If the knowledge worker selects Edit button 128, processor 70 presents the display illustrated in FIG. 3D so that the knowledge worker may continue with the execution of a particular knowledge module 32. GUI 72 further includes a Create button 130 operated by the knowledge worker to create a new working document 54. If the knowledge worker selects Create button 130, processor 70 presents the display associated with FIG. 3E so that the knowledge worker may initiate the execution of a knowledge module 32.

Figure 3D:
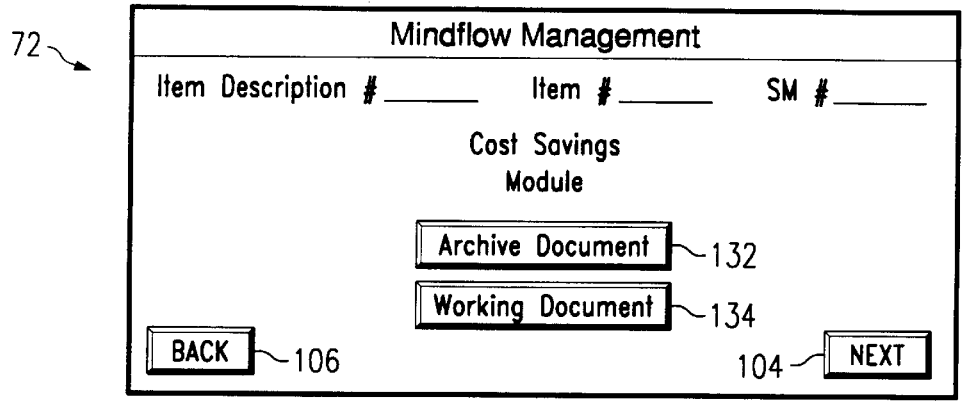

FIG. 3D illustrates one display of GUI 72 that includes an archive document button 132 and a working document button 134. A knowledge worker may operate archive document button 132 to retrieve selected documents 54 from archive 52. The knowledge worker may view an archive document 54 in a display of GUI 72 while simultaneously operating a different working document 54. A knowledge worker may also copy a portion of the information stored in a particular archive document 54 for use in a separate working document 54.

A knowledge worker may operate working document button 134 to open a working document having information detailing the execution of an associated knowledge module 32. Upon opening a working document 54, the knowledge worker may resume execution of the associated knowledge module 32 from any appropriate point of execution in the knowledge module 32. For example, a knowledge worker may resume execution of the knowledge module 32 from a particular subprocess 84. A knowledge worker may receive either read-only or edit privileges for a working document 54 based upon the user identification information. If the knowledge worker has edit privileges, then the knowledge worker may make and save changes within working document 54.

FIG. 3E illustrates one display of GUI 72 operated by a knowledge worker to perform a query session with module 38. GUI 72 includes questions 138 and answers 140 of the query session. Module 70 presents to the knowledge worker questions 138 according to the subject matter of the selected knowledge module 32 and the item identified by fields 120–124 and/or in response to answers 140 provided by the knowledge worker to previous questions 138. A knowledge worker provides answers 140 to questions 138 to provide information regarding the execution of the selected knowledge module 32, such as information characterizing the item identified in fields 120–124.

GUI 72 includes a Save button 142 operated by the knowledge worker to save the answers 140 in the associated working document 54. GUI 72 includes an Execute button 144 operated by the knowledge worker to trigger the execution of one or more rule functions associated with questions 138 and answers 140, as described in greater detail with reference to FIGS. 4 and 5. In one embodiment, the execution of rule functions associated with questions 138 and answers 140 triggered by the operation of Execute button 144 initiates the presentation of additional questions 138 to the knowledge worker, as illustrated in FIG. 3F. GUI 72 further includes a Print button 146 operated by the knowledge worker to print the screen, such as in a report form.

Figure 3F:
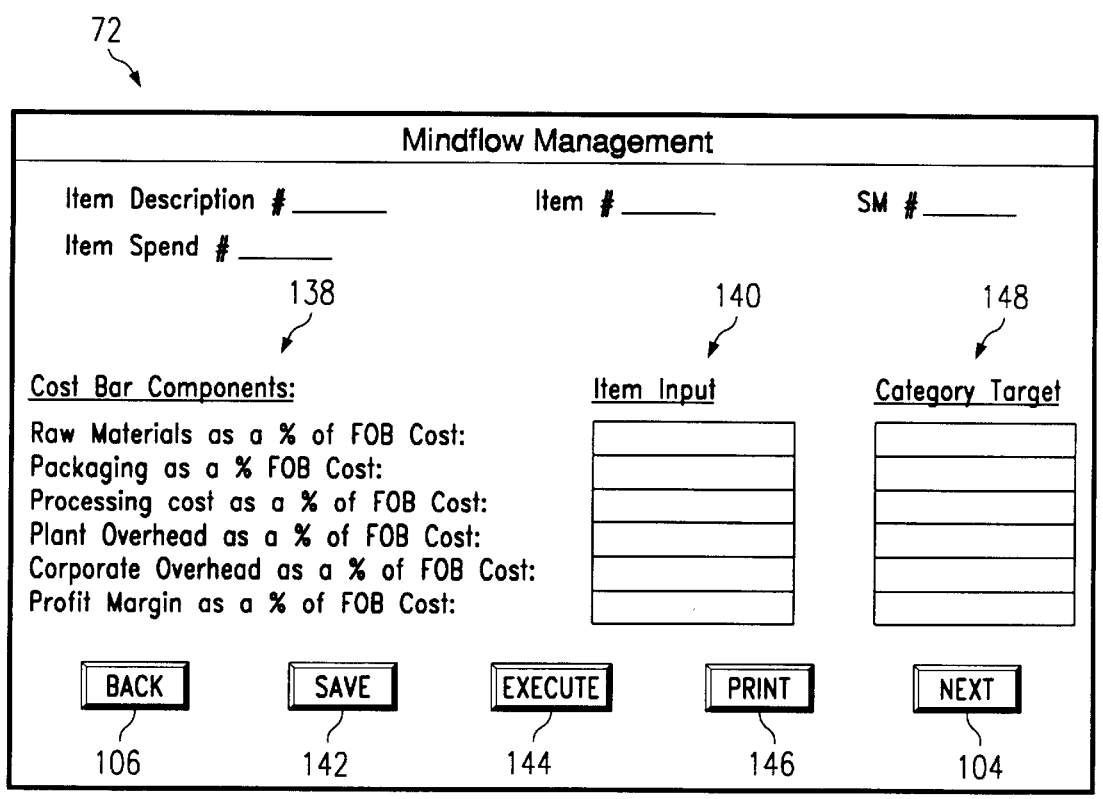

FIG. 3F illustrates one display of GUI 72 operated by the knowledge worker to continue the query session. GUI 72 includes additional questions 138 and answers 140, and also includes default or otherwise representational information 148. Processor 70 selects questions 138 based upon prior questions 138 and answers 140, such as those illustrated in FIG. 3E, as described in greater detail with reference to FIGS. 4 and 5. Default information 148 comprises any suitable information that may provide guidance to the knowledge worker in generating answer 140. For example, default information 148 may comprise target values for answers 140 to questions 138. The operation of Execute button 144 triggers the execution of any rule functions associated with the current questions 138 and answers 140. Although no further questions 138 and answers 140 are illustrated in FIGS. 3G–3K, it should be understood that the execution of the rule functions may initiate the presentation of still more questions 138 to the knowledge worker. If no further questions 138 remain to be presented to the knowledge worker, module 38 analyzes the information collected from the knowledge worker to identify potential cost-savings opportunities.

FIG. 3G illustrates one display of GUI 72 operated by a knowledge worker to identify and determine the feasibility of knowledge items 46. GUI 72 identifies knowledge items 46 retrieved from warehouse 44 based upon the query session illustrated in FIGS. 3E and 3F. In this embodiment, knowledge items 46 comprise potential cost-savings opportunities for the organization of the knowledge worker. GUI 72 further includes feasibility determination fields 164 that are operated by management knowledge workers in various departments of the organization to review knowledge items 46 and provide feedback regarding the viability of implementing a knowledge item 46 in the execution of the selected knowledge module 32.

For example, management knowledge workers may review a potential cost-savings opportunity to determine whether it should be implemented in the cost-savings knowledge module 32. In this respect, different departments of an organization have a voice in the execution of a knowledge module 32 according to specific factors affecting that department. A department that disapproves of a particular cost-savings opportunity may indicate such a disapproval using a "X". Furthermore, a department that approves of a particular cost-savings opportunity may indicate such an approval by using a "✓". GUI 72 further includes a New button 166 operated by the knowledge worker to generate a new knowledge item 46 for feasibility review by management knowledge workers of the organization. The knowledge worker operates Execute button 144 to proceed with the evaluation of specific cost-savings opportunities, such as those approved by the departments of the organization.

FIG. 3H illustrates one display of GUI 72 operated by a knowledge worker to evaluate knowledge items 46. GUI 72 includes knowledge items 46, associated parameters 172, and parameter values 174. In one embodiment, knowledge items 46 presented in GUI 72 include those knowledge items 46 approved by management knowledge workers of the organization. Module 30 generates parameters 172 based upon the selected knowledge module 32, and assigns a weighting factor, not explicitly shown, to each parameter 172 to indicate the relative importance of the parameter 172 with respect to other parameters 172. For example, module 30 may assign a weighting factor to each parameter 172 based upon the relevance of each parameter 172 to the business task of the selected knowledge module 32. The weighting factors for parameters 172 may be stored as data items 36 in data warehouse 34.

It should be understood that any number and combination of parameters 172 associated with the selected knowledge module 32 may be used to evaluate the knowledge items 46. Examples of parameters 172 associated with the cost-savings knowledge module 32 may include the estimated savings of the cost-savings opportunity, the research and development resources to be spent on the cost-savings opportunity, and the time required to implement the cost-savings opportunity.

The knowledge worker provides parameter values 174 associated with a particular parameter 172 to evaluate a particular knowledge item 46. In one embodiment, the knowledge worker may review similar parameter values 174 provided by a previous knowledge worker, and stored in an archive document 54, to learn from the experiences of other knowledge workers facing similar business issues. The knowledge worker may operate Execute button 144 to trigger the determination of a value index for each knowledge item 46 based upon the weighting factor of each parameter 172 and the parameter values 174 provided by the knowledge worker. In one embodiment, parameter values 174 may comprise a prioritization of knowledge items 46 according to each particular parameter 172.

Figure 3I:
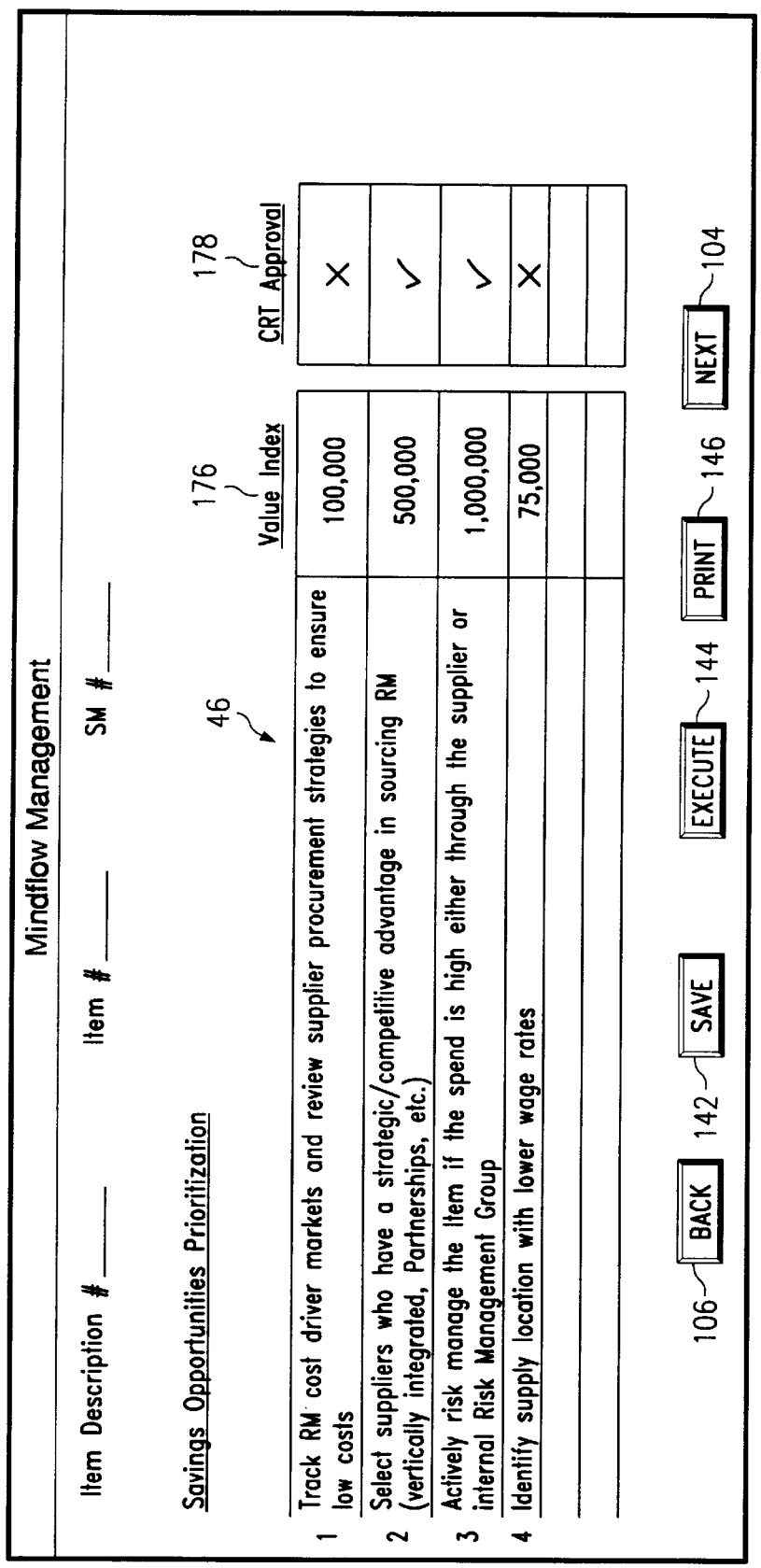

FIG. 3I illustrates one display of GUI 72 operated by a knowledge worker to select a particular knowledge item 46 to implement in the execution of the selected knowledge module 32. GUI 22 includes a value index 176 determined by module 30 for each knowledge item 46, and a selection field 178. Value index 176 is determined by module 30 as a function of the weighting factors for parameters 172 and the parameter values 174 provided by the knowledge worker. In one embodiment, value index 176 is determined based upon one or more business functions stored as data items 36 in data warehouse 34. Selection fields 178 are operated by one or more knowledge workers to select a particular knowledge item 46 based upon the determined value index 176. The knowledge worker may operate Execute button 144 to implement the selected knowledge items 46 in the execution of the selected knowledge module 32. For example, the knowledge worker may execute the cost-savings knowledge module 32 using the cost-savings opportunities selected in field 178.

In one embodiment, module 30 determines from data warehouse 34 a number of business tools to be operated by the knowledge worker to perform the selected knowledge module 32 using the selected knowledge items 46. For example, module 30 may select one or more particular spreadsheet applications, word-processing applications, optimization applications, or any other suitable software applications operated by the knowledge worker to perform the cost-savings knowledge module 32 using the cost-savings opportunities selected by the knowledge worker.

Figure 3J:
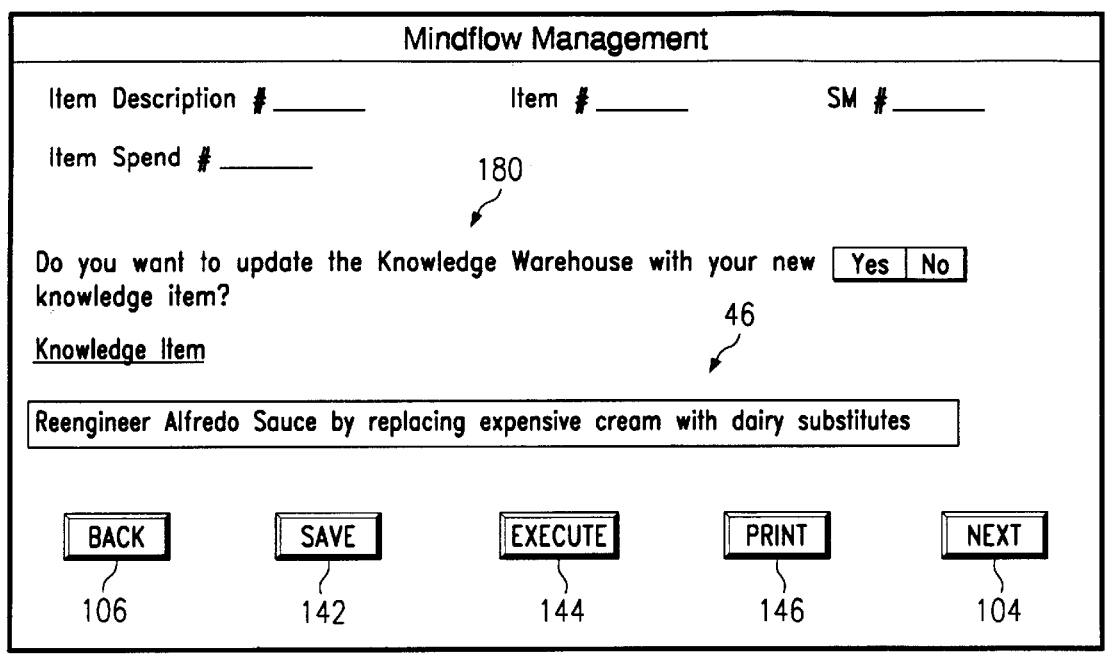

FIG. 3J illustrates one display of GUI 72 operated by a knowledge worker to update knowledge items warehouse 44 with one or more new knowledge items 46 developed by the knowledge worker. GUI 72 includes a new knowledge item 46 developed by the knowledge worker and a question 180 to determine whether the knowledge worker wants to store the new knowledge item 46 in knowledge items warehouse 44. By maintaining knowledge items 46 generated by knowledge workers, system 10 supports an active and growing knowledge items warehouse 44. Furthermore, a knowledge worker may implement a knowledge item 46 generated by another knowledge worker in the execution of a knowledge module 32. In this respect, system 10 raises the business IQ of an organization to a common level.

Figure 3K:
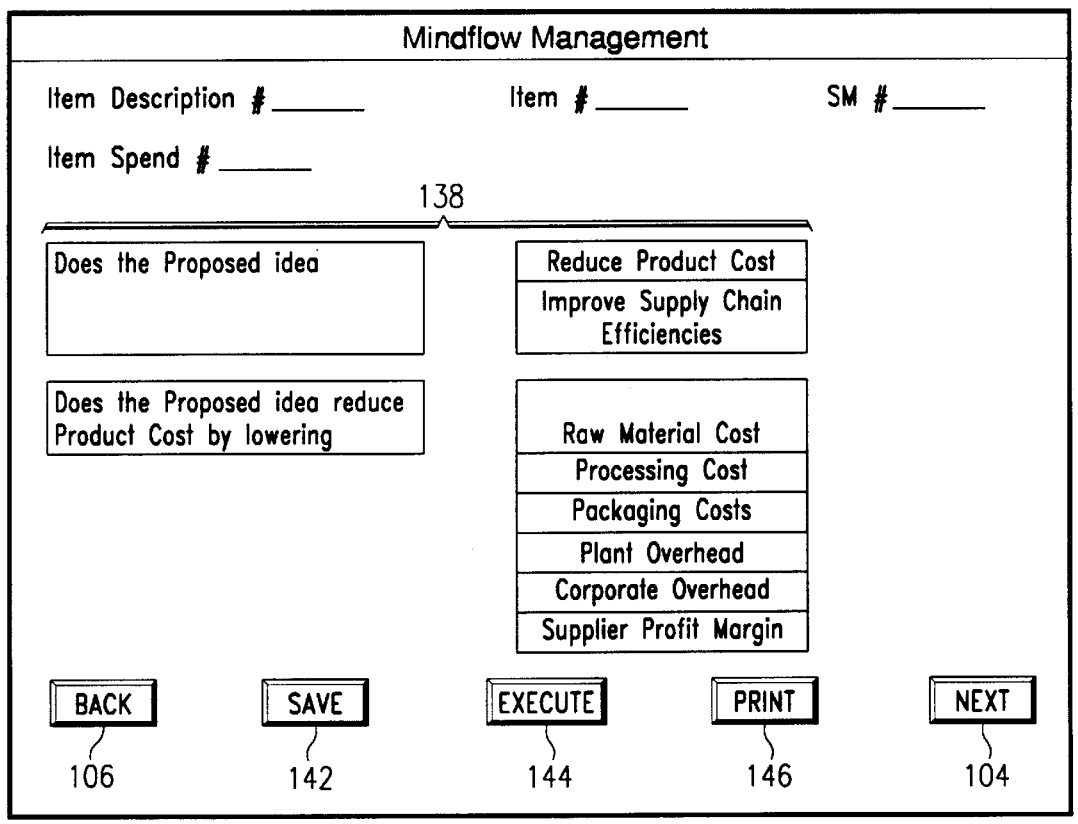

FIG. 3K illustrates one display of GUI 72 operated by a knowledge worker to map a new knowledge item 46 into warehouse 44 for storage. GUI 72 includes additional questions 138 presented during a second query session with the knowledge worker. Module 30 stores the new knowledge item 46 in warehouse 44 indexed according to the results of the query session. In one embodiment, questions 138 of the second query session may comprise questions 138 already answered by the knowledge worker in a previous query session, as illustrated in FIGS. 3E–3F. In this embodiment, module 30 need not present a duplicate question 138 to the knowledge worker, and instead, retrieves from working document 54 the appropriate answer 140 previously provided by the knowledge worker. In this respect, module 30 operates with module 42 to map new knowledge items 46 into warehouse 44 for storage such that knowledge items 46 may be later retrieved by knowledge item retrieval module 38 as described above.

Figure 4:
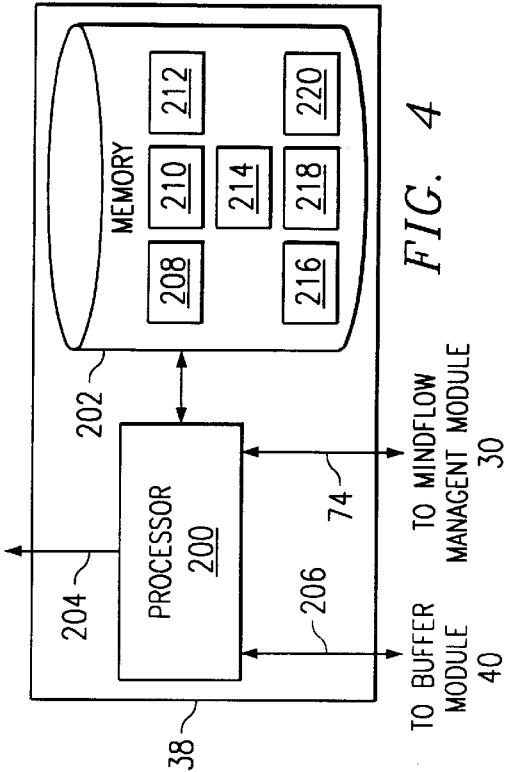
FIG. 4 illustrates one embodiment of a knowledge item retrieval module of the system.

FIG. 4 illustrates one embodiment of a knowledge item retrieval module 38 of system 10. Module 38 includes a processor 200 coupled to a memory 202. Processor 200 comprises any suitable combination of hardware and software in computer 60 to provide the described function or operation of knowledge item retrieval module 38. Processor 200 maintains a link 74 to mindflow management module 30, a link 204 to knowledge items warehouse 44, and a link 206 to buffer module 40. Links 74, 204, and 206 comprise any suitable communication paths between the identified components.

Memory 202 comprises any suitable volatile or non-volatile memory device associated with computer 60. Memory 202 generally stores a number of files, lists, tables, or any other arrangement of information that supports the retrieval of knowledge items 46 from warehouse 44 in response to a query session conducted by module 30 with a knowledge worker. For example, memory 202 includes a Question table 208, a Rule-Function table 210, a Question-Groups table 212, an Answer table 214, a Knowledge-Item table 216, a Translation table 218, and an Answer-Function table 220. Tables 208–220 are described in greater detail with reference to FIGS. 5A–5G. In general, processor 200 accesses the information stored in tables 208–220 to retrieve knowledge items 46 from knowledge items warehouse 44 in response to a query session performed by mindflow management module 30 with a knowledge worker. Processor 200 communicates the retrieved knowledge items 46 to buffer module 40 using link 206.

FIG. 5A illustrates one embodiment of a Question table 208 that is used by module 38 to perform an interactive query session with a knowledge worker. Question table 208 includes question information 230 and answer information 232. Question information 230 includes question identifiers 250, question weighting factors 252, questions 138, and question status information 256. Answer information 232 includes answer type information 258, answers 140, and rule-function identifiers 262.

A question identifier 250 comprises any appropriate referencing, linking, or addressing information used to identify a question 138. Question identifiers 250 index questions 138 stored in question table 208. A question weighting factor 252 comprises a value used to gauge the relative importance of a particular question 138 with respect to other questions 138 within the context of the selected knowledge module 32. In general, question weighting factor 252 comprises an intermediate weighting factor used by module 40 to determine an accumulated weighting factor for a particular knowledge item 46, as described in greater detail below.

A question 138 comprises an expression of inquiry presented to a knowledge worker to collect information used to select particular knowledge items 46 from warehouse 44. Each question 138 comprises one of an independent question or a dependent question as indicated by question status information 256. An independent question 138 comprises a question presented to a knowledge worker at the beginning of a query session. The presentation of an independent question 138 to a knowledge worker does not depend upon the answer to a prior question 138. A dependent question 138 comprises a question presented to the knowledge worker in response to the answer 140 of a prior independent question 138 or a prior dependent question 138.

Answers 140 comprise responses of a knowledge worker to a question 138. Answer type information 258 indicates whether the answer 140 to a particular question 138 comprises a specified answer or a non-specified answer. Specified answers are included among answers 140 in table 208 for a particular question 138 and, in one embodiment, are selected by the knowledge worker from a list present in a display of GUI 72. Non-specified answers are not included among answers 140 in table 208 and are instead provided by the knowledge worker in response to a particular question 138.

A rule function identifier 262 comprises any appropriate referencing, linking, or addressing information used to index a rule function in Rule-Function table 210 based upon the question 138 presented to the knowledge worker and the answer 140 received in response. In general, module 38 determines whether an answer 140 to a particular question 138 presented to a knowledge worker is associated with a rule function identifier 262, as indicated by table 208. If so, the associated rule function identifier 262 indexes an entry in Rule Function table 210, as described in greater detail with reference to FIG. 5B. If not, a question identifier 250 and an answer 140 combine to index an entry in Answer table 214, as described in greater detail with reference to FIG. 5D.

FIG. 5B illustrates one embodiment of a Rule-Function table 210 that includes a rule function identifier 262, a rule function 270, a question group identifier 278, and a question group weighting factor 280. Each rule function identifier 262 associates a rule function 270 with an answer 140 to a question 138. In one embodiment, rule function 270 includes an initial value 272, an operator 274, and a discriminant 276. Module 38 generally applies rule function 270 to an associated answer 140 provided by the knowledge worker. Based upon the outcome of rule function 270, module 38 determines a group of dependent questions 138 for presentation to the knowledge worker, identifies knowledge items 46 using Answer table 214, or both.

Initial value 272 comprises a default value for the result of the rule function 270. Operator 274 comprises any suitable operation, such as a mathematical or logical operation, that may be applied to an associated answer 140. Although Rule-Function table 210 is illustrated using logical operators 274 such as "equal to," "greater than," and "less than," it should be understood that rule function 270 may include any suitable number and combinations of operators 274. Discriminant 276 comprises any suitable value with which an associated answer 140 is compared during the application of a rule function 270. In one embodiment, if an answer 140 satisfies a rule function 270 as determined by the operator 274 and the discriminant 276, then the result of the rule function 270 is true. If an answer 140 fails to satisfy an associated rule function 270, then the result of the rule function 270 is false.

Question group identifiers 278 comprise any appropriate referencing, linking, or addressing information used to associate a rule function identifier 262 with one or more question identifiers 250 in Question-Groups table 212. A question group weighting factor 280 is associated with a corresponding question group identifier 278 and comprises a value used to gauge the relative importance of a group of questions 138 identified by the associated question group identifier 278. As discussed above with regard to question weighting factor 252, question group weighting factor 280 comprises an intermediate weighting factor used by module 40 to determine an accumulated weighting factor for a particular knowledge item 46.

In general, module 38 determines whether a rule function 270 is associated with an answer 140 provided by the knowledge worker using the information stored in Question table 208. If no rule function 270 is associated with an answer 140 provided by the knowledge worker, then module 38 indexes an entry in Answer table 214 to identify one or more knowledge items 46 using the answer 140 and the question identifier 250 of the question 138 presented to the knowledge worker. If a rule function 270 is associated with an answer 140 provided by the knowledge worker, then module 38 applies the rule function 270 to the associated answer 140. Based upon the result of the rule function 270, module 38 identifies one or more dependent questions 138 for presentation to the knowledge worker using the appropriate question group identifier 278 to index one or more entries in Question-Groups table 212, identifies one or more knowledge items 46 using the answer 140 and the question identifier 250 to index an entry in Answer table 214, or both.

FIG. 5C illustrates one embodiment of a Question-Groups table 212 that stores a number of question group identifiers 278 and at least one question identifier 250 associated with each question group identifier 278. In general, module 38 determines a question group identifier 278 based upon the result of rule function 270 from Rule-Function table 210. Module 38 further identifies questions 138 of Questions table 208 based upon the question identifier 250 associated with the determined question group identifier 278. In this respect, module 38 determines which questions 138 should be presented to the knowledge worker by using information stored in Rule-Function table 210 and Question-Groups table 212.

FIG. 5D illustrates one embodiment of an Answer table 214 that stores a number of knowledge item group identifiers 294, each knowledge item group identifier 294 indexed by a question identifier 250, and an answer identifier 260. In general, module 38 determines a knowledge item group identifier 294 based upon the question identifier 250 of the question 138 presented to the knowledge worker, and the answer 140 provided by the knowledge worker. Knowledge item group identifier 294 comprises any appropriate referencing, linking, or addressing information used to associate a question identifier 250 and an answer 140 with an entry in Knowledge-Item table 216. Answer table 214 further includes a knowledge item group weighting factor 292 associated with each knowledge item group identifier 294. Knowledge item group weighting factor 292 comprises a value used to gauge the relative importance of the group of knowledge items 46 identified by the associated knowledge item group identifier 294. Knowledge item group weighting factor 292, like weighting factors 252 and 280, comprises an intermediate weighting factor used by module 40 to determine an accumulated weighting factor for a particular knowledge item 46.

FIG. 5E illustrates one embodiment of a Knowledge-Item table 216 that stores a number of knowledge items 46, each knowledge item 46 indexed by a knowledge item group identifier 294. In one embodiment, each knowledge item 46 is associated with a knowledge item identifier 300 and a knowledge item weighting factor 302. A knowledge item identifier 300 comprises any appropriate referencing, linking, or addressing information used to identify a particular knowledge item 46 associated with a knowledge item group identifier 294. A knowledge item weighting factor 302 is associated with each knowledge item 46 and comprises a value used to gauge the relative importance of the associated knowledge item 46 to the knowledge worker based upon the context of the selected knowledge module 32. Knowledge item weighting factor 302 comprises an intermediate weighting factor used by module 40 to determine an accumulated weighting factor for the knowledge item 46.

In general, module 38 determines knowledge item group identifier 294 from Answer table 214, as described above with reference to FIG. 5D. Module 38 identifies one or more Knowledge Items 46 indexed by the determined knowledge item group identifier 294 in Knowledge-Items table 216. Furthermore, module 38 gathers each of the intermediate weighting factors 252, 280, 292, and 302 determined from tables 208-220 during the course of identifying a particular knowledge item 46. Module 38 determines an accumulated weighting factor for the particular knowledge item 46, as described in greater detail with reference to FIG. 7, based upon the gathered intermediate weighting factors 252, 280, 292, and 302. In this respect, module 38 determines an accumulated weighting factor that gauges the relative importance of the associated knowledge item 46 based upon the results of a query session with the knowledge worker.

Figures 5F, 5G:
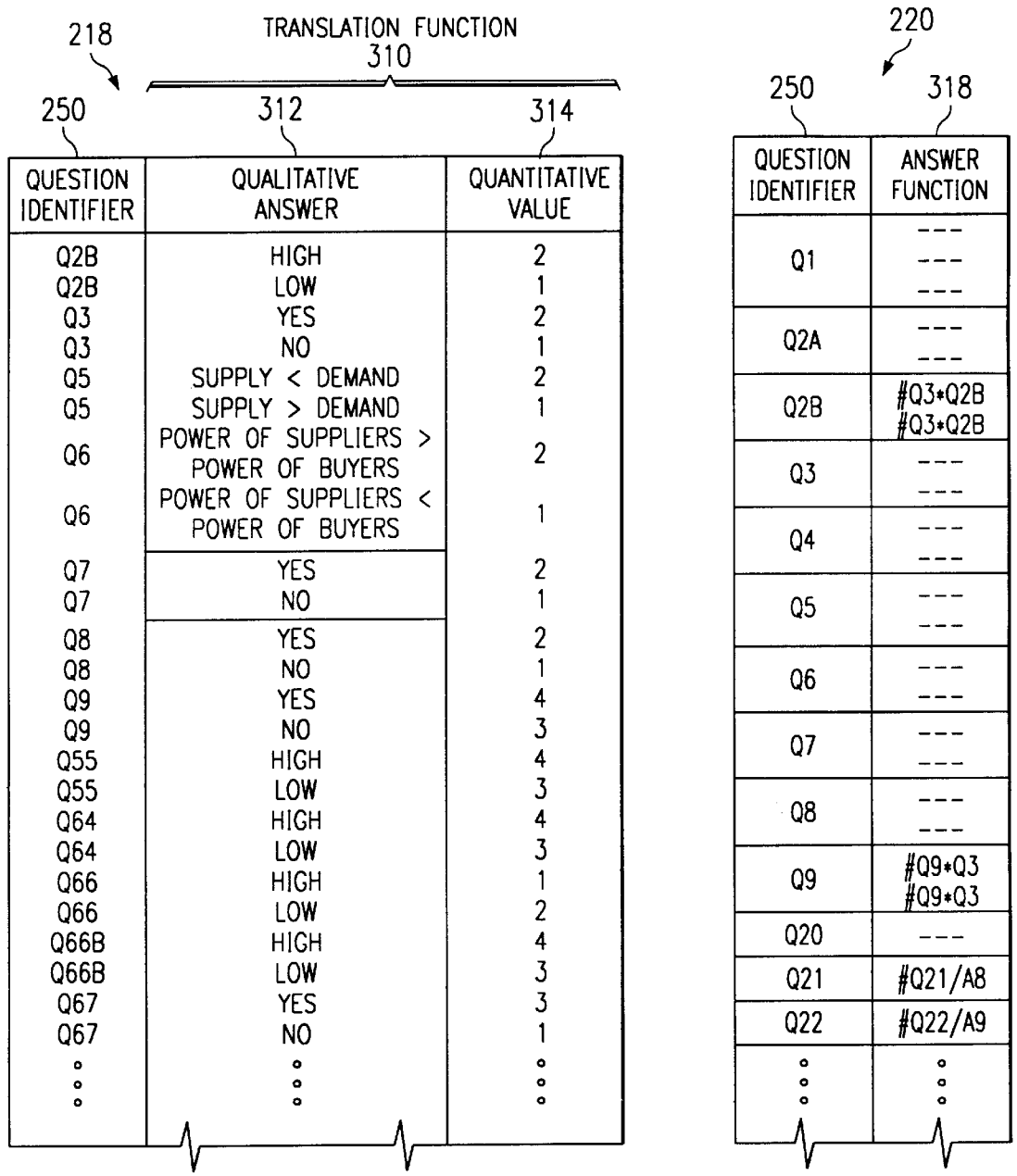

FIG. 5F illustrates one embodiment of a Translation table 218 that stores a number of translation functions 310, each translation function 310 associated with a question identifier 250. In one embodiment, translation function 310 comprises a qualitative answer 312 and a corresponding quantitative answer 314. An answer 140 provided by a knowledge worker in response to a question 138 may comprise a qualitative answer 312 of function 310. In general, module 38 translates a qualitative answer 312 provided by the knowledge worker into a quantitative answer 314 using the translation function 310 associated with the question identifier 250 of the question 138 presented to the knowledge worker. In one embodiment, module 38 may later apply a mathematical operation to the quantitative answer 314 to further process the qualitative answer 312 provided by the knowledge worker.

FIG. 5G illustrates one embodiment of an Answer-Function table 220 that stores a number of answer functions 318, each answer function 318 associated with a question identifier 250. In general, module 38 may process an answer 140 provided by the knowledge worker using an answer function 318 associated with the question identifier 250 of the question 138 presented to the knowledge worker. An answer function 318 comprises any suitable mathematical formula that operates upon one or more answers 140 provided by the knowledge worker and/or any other values stored as data items 36 in data warehouse 34. A module 38 may apply an answer function 318 to an answer 140 to condition the answer 140 for subsequent application of a rule function 262.

Figures 6, 7:
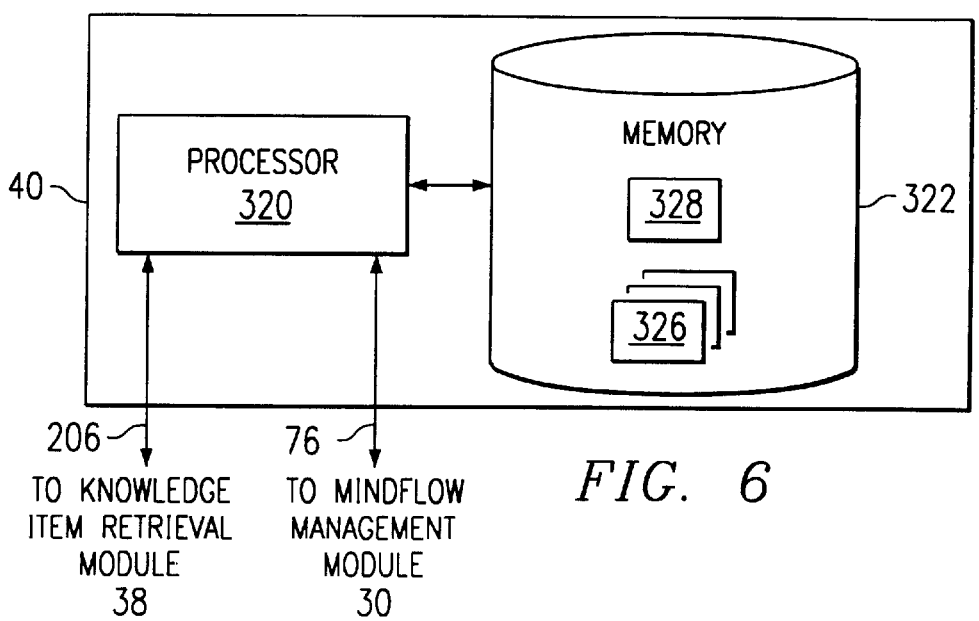
FIG. 6 illustrates one embodiment of a buffer module of the system.
FIG. 7 illustrates exemplary information used by the buffer module.

FIG. 6 illustrates one embodiment of a buffer module 40 of system 10. Module 40 includes a processor 320 coupled to a memory 322. Processor 320 comprises any suitable combination of hardware and software in computer 60 to provide the described function or operation of buffer module 40. Processor 320 maintains a link 206 to knowledge item retrieval module 38 and a link 76 to mindflow management module 30. Links 206 and 76 comprise any suitable communication paths between the identified components.

Memory 322 comprises any suitable volatile or non-volatile memory device associated with computer 60. Memory 322 generally stores a number of files, lists, tables, or any other arrangement of information that supports the selection of knowledge items 46 retrieved by knowledge item retrieval module 38. For example, memory 322 includes rules 326 and a buffer table 328. Rules 326 comprise instructions, algorithms, or any other directive used by module 40 to select particular knowledge items 46. Buffer table 328 includes information associated with the knowledge items 46 retrieved by module 38 from warehouse 44. In general, processor 320 uses the information stored in table 328 to select a portion of the knowledge items 46 retrieved by knowledge item retrieval module 38, according to rules 326. Processor 320 communicates the selected knowledge items 46 to mindflow management module 30 using link 76.

FIG. 7 illustrates one embodiment of buffer table 328 that includes columns 352–360 to index information associated with the knowledge items 46 retrieved by module 38 from warehouse 44. A column 352 includes knowledge item identifiers 300 to identify those knowledge items 46 retrieved by module 38 using the retrieval techniques described above with regard to FIGS. 4 and 5.

A column 354 stores an accumulated weighting factor determined by module 38 for each knowledge item 46 identified in column 352. An accumulated weighting factor comprises a function of each intermediate weighting factor determined by module 38 for a corresponding knowledge item 46. For example, an accumulated weighting factor may comprise a function of one or more question weighting factors 252, question group weighting factors 280, knowledge item group weighting factors 292, and knowledge item weighting factors 302. In a particular embodiment, to determine accumulated weighting factor 354, processor 320 multiplies together each of the intermediate weighting factors gathered by module 38 while retrieving a knowledge item 46 using the retrieval techniques described above with references to FIGS. 4 and 5.

A column 356 includes a buffer group for each corresponding knowledge item 46 identified in column 352. Each buffer group comprises an association of knowledge items 46 determined according to one or more business models embodied in rules 326. In general, knowledge items 46 arranged in a common buffer group share one or more business characteristics. Processor 320 retrieves a selected number of knowledge items 46 from each buffer group stored in column 356 according to rules 326. Therefore, module 40 arranges the referred knowledge items 46 in buffer groups defining various business characteristics and selects one or more knowledge items 46 from each buffer group. In this respect, module 40 presents to the knowledge a wide variety of knowledge items 46 applicable to a broad array of business issues facing the knowledge worker.

Column 356 includes a buffer weighting factor for each corresponding knowledge item 46 identified in column 352. Each buffer weighting factor comprises a value used to gauge the relative importance of the knowledge item 46 with respect to all other knowledge items 46 retrieved by module 38. In one embodiment, a knowledge item 46 may be associated with the same or different buffer weighting factor for each buffer group to which knowledge item 46 belongs. For example, the knowledge item 46 having identifier 300a in table 328 includes a different weighting factor for a buffer group one and a buffer group two. In addition, each knowledge item 46 may also be associated with one or more buffer weighting factors for a single buffer group depending upon the criteria used by module 38 to retrieve the knowledge item 46 from warehouse 44. For example, the knowledge item 46 having identifier 300a in table 328 includes two different buffer weighting factors for a buffer group two.

Column 360 includes a total weighting factor for each corresponding knowledge item 46 identified in column 352. Each total weighting factor comprises a function of the buffer weighting factor and the accumulated weighting factor for a particular knowledge item 46. In one embodiment, the total weighting factor stored in column 360 is directly proportional to the buffer weighting factor and the accumulated weighting factor for a particular knowledge item 46.

In operation, processor 320 processes the information stored in table 328 according to rules 326 to select particular knowledge items 46 for communication to mindflow management module 30, and for presentation to a knowledge worker. In one embodiment, processor 320 ranks each knowledge item 46 within a buffer group according to the total weighting factors for each knowledge item 46. Processor 320 then retrieves a predetermined number of the knowledge items 46 from a first buffer group and a predetermined number of knowledge items 46 from a second buffer group according to the ranking of knowledge items 46 within each buffer group. Rules 326 determine the predetermined number of knowledge items 46 from each buffer group that module 40 selects and communicates to module 30 for presentation to the knowledge worker. Therefore, for example, module 40 may select the knowledge item 46 having the highest total weighting factor in the first buffer group, and the knowledge item 46 having the highest total weighting factor in the second buffer group.

Referring to FIG. 7, applying the rules 326 described above, module 40 selects knowledge item 46 having identifier 300a from buffer group one because it has the highest total weighting factor, eight-tenths, of any knowledge item 46 in buffer group one. Module 40 selects knowledge item 46 having identifier 300a from buffer group two because it has the highest total weighting factor, one and two-tenths, of any knowledge item 46 in buffer group two. In one embodiment, module 40 determines that knowledge item 46 having identifier 300a is selected from both buffer group one and two. In this embodiment, module 40 may either substitute knowledge item 46 having identifier 300a with the knowledge item 46 having the next highest total weighting factor in either buffer group one or two, or module 40 may select the knowledge item 46 having the next highest total weighting factor in either buffer group one or two in addition to selecting knowledge item 46 having identifier 300a.

Module 40 determines the buffer group and buffer weighting factor of each knowledge item 46 stored in column 352 based upon rules 326 stored in memory 322. Because knowledge items 46 are arranged in buffer groups 354 according to the business characteristics of knowledge items 46, by retrieving a selected number of knowledge items 46 from each buffer group 354, processor 320 presents to the knowledge worker a broad range of knowledge items 46 associated with a broad range of business characteristics.

Figure 8:
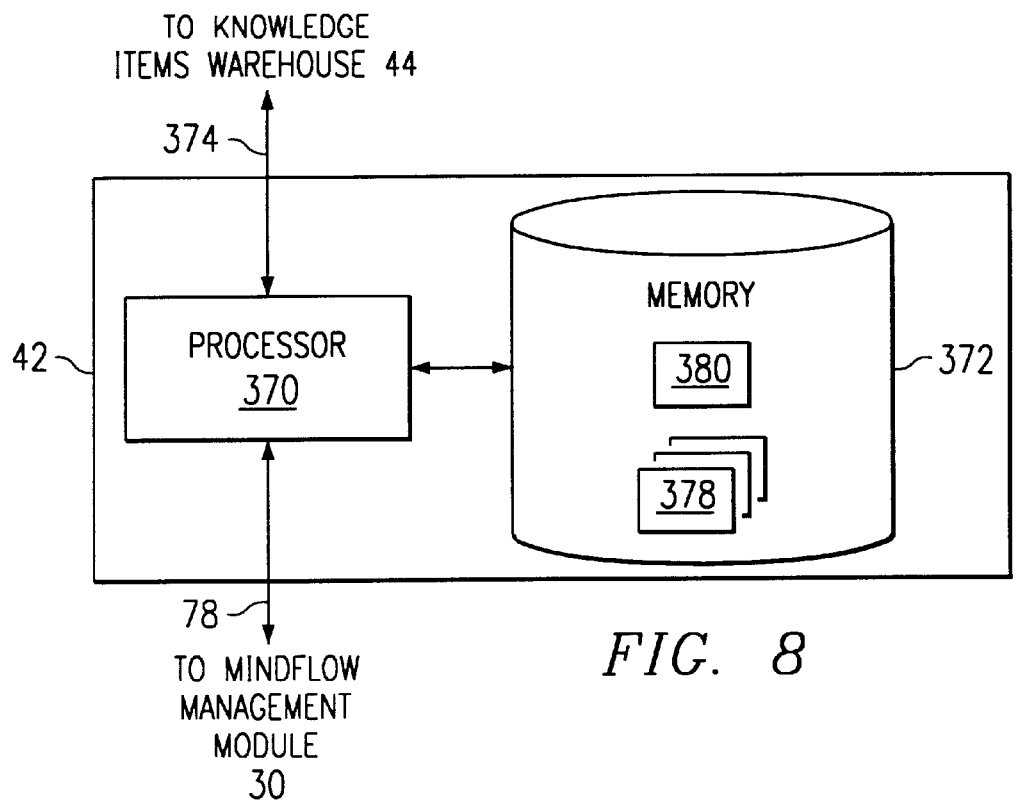
FIG. 8 illustrates one embodiment of a knowledge item accumulation module of the system.

FIG. 8 illustrates one embodiment of a knowledge item accumulation module 42 of system 10. Module 42 includes a processor 370 coupled to a memory 372. Processor 370 comprises any suitable combination of hardware and software in computer 60 to provide the described function or operation of knowledge item accumulation module 42. Processor 370 maintains a link 374 to knowledge items warehouse 44 and link 78 to mindflow management module 30. Links 374 and 78 comprise any suitable communication paths between the identified components.

Memory 372 comprises any suitable volatile or non-volatile memory device associated with computer 60. Memory 372 generally stores a number of files, lists, tables, or any other arrangement of information that supports the accumulation of knowledge items 46 in knowledge items warehouse 44. For example, memory 372 includes rules 378 and knowledge item accumulation table 380. Rules 378 comprise instructions, algorithms, or any other directive used by module 42 to determine the appropriate knowledge item weighting factor 302 for a particular knowledge item 46 generated by a knowledge worker. In one embodiment, management knowledge workers may determine rules 378 based upon any relevant business factors or criteria affecting the organization of the knowledge worker, such as the relative impact of a particular knowledge item 46 upon the execution of a selected knowledge module 32 by the knowledge worker. Knowledge item accumulation table 380 includes information used by module 42 to perform a query session with the knowledge worker. In general, processor 370 performs the query session with the knowledge worker to store knowledge items 46 in warehouse 44 according to rules 378 and the results of the query session. Processor 370 communicates the accumulated knowledge items 46 to knowledge items warehouse 44 using link 374.

FIG. 9 illustrates one embodiment of a knowledge item accumulation table 380 that is used by module 42 to store knowledge items 46 generated by the knowledge worker in knowledge items warehouse 44 such that the knowledge items 46 may later be retrieved by a knowledge worker using the retrieval techniques described above with reference to FIGS. 4 and 5. Table 380 includes question information 390 and answer information 392. Question information 390 includes question identifiers 250, questions 138, question status information 256, and history information 394. Answer information 392 includes answer type information 258, answers 140, and trigger information 398.

A question identifier 250 comprises any appropriate referencing, linking, or addressing information used to index a question 138 stored in knowledge item accumulation table 380. Each question 138 comprises one of an independent question or a dependent question as indicated by question status information 256. History information 394 comprises a flag or any other suitable information that indicates whether question 138 has been presented to the knowledge worker in a previous query session, either associated with knowledge item retrieval module 38 or knowledge item accumulation module 42. History information 394 further comprises a pointer, a link, or any other suitable addressing information used to reference an answer 140 provided by the knowledge worker to a previously presented question 138.

The answer 140 referenced by information 394 may be stored in a working document 54 associated with the knowledge module 32 being executed by the knowledge worker. If history information 394 indicates that a question 138 was previously presented to the knowledge worker, then information 394 may be used to reference the answer 140 in working document 54. In this respect, system 10 maintains and accesses answers 140 provided by a knowledge worker to previously presented questions 138 so that the knowledge worker need not answer a particular question 138 more than once during the execution of the selected knowledge module 32. Trigger information 398 associated with a particular question identifier 250 and answer 140 comprises a question identifier 250, a knowledge item group identifier 294, or both.

In operation, processor 370 receives a knowledge item 46 from a knowledge worker during execution of a selected knowledge module 32. Processor 370 then initiates a query session with the knowledge worker to determine a mapping of the knowledge item 46 to warehouse 44. Although the following description of the operation of module 42 is detailed with reference to processing a particular question 138 in the query session, it should be understood that the query session may include any number and combination of independent and dependent questions 138 to determine an appropriate mapping of a knowledge item 46. Upon identifying a particular question 138 for presentation to the knowledge worker, processor 370 determines whether the question 138 was previously presented to the knowledge worker. If so, processor 370 retrieves the answer 140 provided by the knowledge worker to the previously presented question 138 using a link or a pointer associated with information 394. If not, processor 370 receives an answer 140 from the knowledge worker and references the appropriate trigger information 398 associated with the question 138 and the answer 140.

Using trigger information 398, processor 370 determines either another question 138 to present to the knowledge worker, a knowledge item group identifier 294 used to index a knowledge item 46 in warehouse 44, or both. If another question 138 is identified using identifier 250, then processor 370 presents the identified question 138, receives an answer 140 from the knowledge worker or from working document 54 using information 394, and references the appropriate trigger information 398 associated with the question 138 and the answer 140, as described above. If a knowledge item group identifier 294 is determined using trigger information 398, then processor 370 stores in knowledge item warehouse 44 the knowledge item 46 indexed by the determined knowledge item group identifier 294. Processor 370 further stores in knowledge item warehouse 44 a knowledge item weighting factor 302 associated with the knowledge item 46 presented by the knowledge worker. In general, processor 370 determines the appropriate knowledge item weighting factor 302 for a particular knowledge item 46 using rules 378 stored in memory 372.

In this respect, knowledge item accumulation module 42 receives knowledge items 46 from a knowledge worker, determines an appropriate knowledge item weighting factor 302 for the knowledge item 46 and an appropriate knowledge item group identifier 294 to index the knowledge item 46 in knowledge item warehouse 44, such that the knowledge item 46 may be retrieved from warehouse 44 according to the retrieval techniques described above with reference to FIGS. 4 and 5. A technical advantage provided by this aspect of the present invention includes the ability to create an active and growing knowledge item warehouse 44 that is updated to raise the business IQ of an organization.

Figure 10:
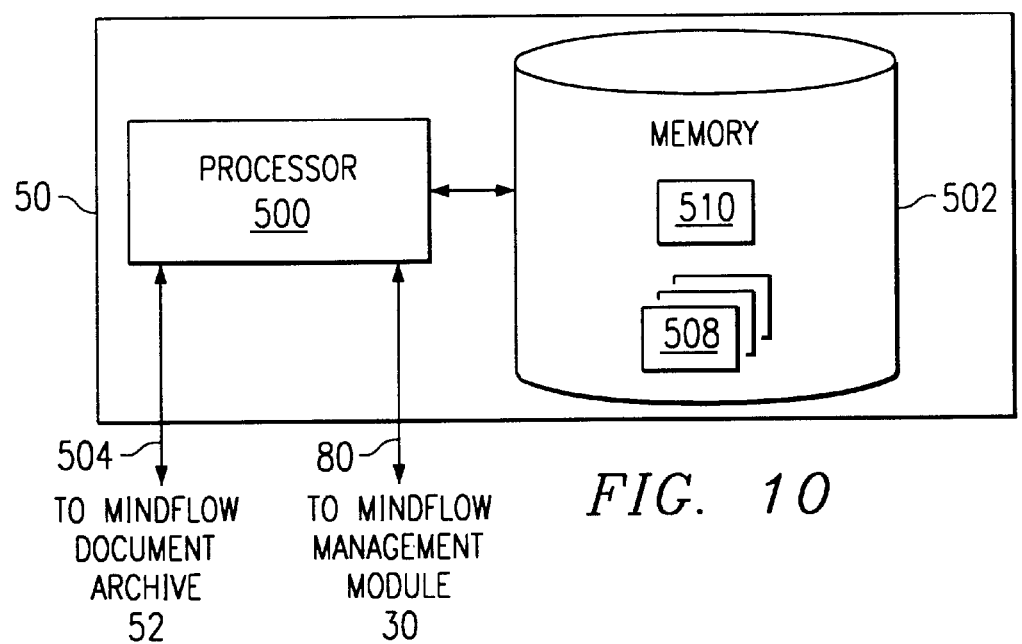
FIG. 10 illustrates one embodiment of a mindflow document retrieval module of the system.

FIG. 10 illustrates one embodiment of a mindflow document retrieval module 50 of system 10. Module 50 includes a processor 500 coupled to a memory 502. Processor 500 comprises any suitable combination of hardware and software in computer 60 to provide the described function or operation of mindflow document retrieval module 50. Processor 500 maintains a link 80 to mindflow management module 30 and a link 504 to mindflow document archive 52. Links 80 and 504 comprise any suitable communication paths between the identified components.

Memory 502 comprises any suitable volatile or non-volatile memory device associated with computer 60. Memory 502 generally stores a number of files, lists, tables, or any other arrangement of information that supports the retrieval of mindflow documents 54 from mindflow document archive 52. For example, memory 502 includes rules 508 and mindflow document retrieval table 510. Rules 508 comprise instructions, algorithms, or any other directive used by module 50 to select one or more documents 54 for retrieval based upon the information stored in documents 54 and the results of a query session performed between module 38 and a knowledge worker. Mindflow document retrieval table 510 includes information for one or more query sessions associated with each document 54 stored in archive 52. In particular, table 510 includes information comparing the results of each query session in documents 54 with the results of a current query session performed by module 38 with a knowledge worker. In general, processor 500 maintains the information stored in table 510 to retrieve mindflow documents 54 from mindflow document archive 52 according to rules 508. Processor 500 communicates the retrieved mindflow documents 54 to mindflow management module 30 using link 80.

FIG. 11 illustrates one embodiment of mindflow document retrieval table 510 that includes columns 520–536. The information stored in columns 522–536 is indexed by document identifiers 542 stored in column 520. A document identifier 542 comprises any suitable referencing, addressing, or linking information that identifies a particular document 54 in archive 52. In general, documents 54 include information detailing one or more query sessions performed by a knowledge worker. Each query session detailed in a document 54 may comprise any number of groups of questions 138 and answers 140. The information in table 510 detailing the query session includes information comparing the results of a query session stored in a document 54 with the results of a current query session performed by module 38 with a knowledge worker, such as information comparing the raw number of answers that match for any given group of questions, or the total number of answers that match among all groups of questions.

In particular, columns 522 and 528 indicate the raw number of answers of a query session in a particular document 54 identified in column 520 that match the answers provided by a knowledge worker to a particular group of questions in a query session performed by module 38. For example, column 522 indicates that fifteen answers in a query session of a document 54 associated with document identifier 540*a* match the answers provided by a knowledge worker to questions in a first question group of a query session performed by module 38. Similarly, column 528 indicates that nine answers in a query session of the document 54 associated with document identifier 540*a* match the answers provided by the knowledge worker to questions in a second question group of the query session performed by module 38. Although table 510 is illustrated with information indicating the results of questions in a first group and a second group of a query session performed by module 38, it should be understood that table 510 may include information comparing the results of query session having any number of groups of questions.

Columns 524 and 530 indicate a weighting factor associated with any particular question group of a query session. For example, column 524 indicates that question group one is associated with a weighting factor of eight-tenths. Similarly, column 530 indicates that question group two is associated with a weighting factor of one and one-half. The question group weighting factors indicated by columns 524 and 530 comprise a value used to gauge the relative importance of the subject matter associated with a particular question group in a query session. In one embodiment, the weighting factors stored in columns 524 and 530 correspond to question group weighting factors 280. Module 50 may determine the question group weighting factors, such as those indicated by columns 524 and 530 of table 510, using rules 508 stored in memory 502.

Columns 526 and 532 indicate the weighted number of answers of a query session in a particular document 54 matching the answers provided by a knowledge worker to a particular group of questions in a query session performed by module 38. The weighted number of answers indicated by columns 526 and 532 comprise a function of the raw number of matching answers of a query session illustrated in columns 522 and 528, and the weighting factor for that particular question group illustrated in columns 524 and 530. For example, by applying the weighting factor for question group one, eight-tenths, to the corresponding raw number of matching answers in document 54 associated with identifier 542*a*, fifteen, module 50 determines that the weighted number of answers matching in question group one is twelve, as illustrated in column 526 of table 510. Similarly, by applying the weighting factor for question group two, one and one-half, to the corresponding raw number of matching answers in document 54 associated with identifier 540*a*, nine, module 50 determines that the weighted number of answers matching in question group two is thirteen and one-half.

Column 534 indicates the raw total number of answers of a query session in a particular document 54 matching the answers provided by a knowledge worker in a query session performed by module 38. Therefore, module. 50 may determine the information stored in column 534 based upon the information stored in columns 522 and 528, and any other information that indicates the raw number of answers of a query session in a particular document 54 matching the answers provided by a knowledge worker to questions in any other question group of a query session performed by module 38. Column 536 indicates the weighted total number of answers in a particular document 54 as determined by module 50 based upon the information stored in columns 526 and 532, and any other information that indicates the weighted number of answers matching in a particular question group of a query session performed by module 38.

In operation, processor 500 maintains the information stored in table 510 to retrieve mindflow documents 54 from mindflow document archive 52 according to rules 508. In one embodiment, module 50 may apply rules 508 to retrieve all documents 54 having a predetermined number of raw answers matching the answers provided by a knowledge worker to one or more particular question groups of a query session performed by module 38. For example, module 50 may apply rules 508 to retrieve all documents 54 having at least ten raw answers matching the answers provided by the knowledge worker to a first group of questions in a query session, and at least ten raw answers matching the answers provided by the knowledge worker to a second group of questions in the query session. Referring to FIG. 11, according to these rules 508 and the information stored in table 510, module 50 retrieves documents 54 associated with document identifiers 542a and 542b. A knowledge worker may modify rules 508 to customize the retrieval of documents 54 from archive 52. For example, a knowledge worker may modify the predetermined thresholds for the number of raw answers matching, weighted answers matching, or both. In this respect, the knowledge worker may broaden or narrow the scope of documents 54 retrieved by module 50.

In another embodiment, module 50 applies rules 508 to determine a question group weighting factor for each different question group of a query session, as illustrated by columns 524 and 530 of table 510. By applying the determined question group weighting factors for each question group to the raw number of answers matching in a corresponding question group, as discussed above, module 50 determines the weighted number of answers matching for the corresponding question groups of a query session, as illustrated in columns 526 and 532 of table 510. Module 50 then applies rules 508 to retrieve all documents 54 having a predetermined number of weighted answers matching in any one or more groups of questions. For example, module 50 may apply rules 508 to retrieve all documents 54 having at least ten weighted answers matching in question group one and at least ten weighted answers matching in question group two. Referring to FIG. 11, according to these rules 508, module 50 retrieves documents 54 associated with document identifiers 542a and 542e.

One of skill in the art can therefore appreciate that module 50 may determine the relative importance of the subject matter associated with the question groups of a query session, indicated by a question group weighting factor, and retrieve documents 54 using the question group weighting factors. In this respect, the present invention provides many technical advantages. First, module 50 may retrieve documents 54 relevant to the overall subject matter of a query session by establishing threshold values for matching answers among the various question groups within a query session. Second, module 50 may retrieve documents 54 most relevant to a particular subject matter of a knowledge module 32 by using question group weighting factors.

In a further embodiment, module 50 may apply rules 508 to retrieve all documents 50 having a predetermined total number of raw answers in a query session matching the answers provided by the knowledge worker, regardless of the number of matching answers within any particular question group, as illustrated in column 534 of table 510. For example, module 50 may apply rules 508 to retrieve those documents 54 having at least twenty-five raw answers matching the answers provided by the knowledge worker in the query session. According to the information stored in table 510 illustrated in FIG. 11 and applying these rules 508, module 50 retrieves documents 542b and 542e.

In yet another embodiment, module 50 applies rules 508 to retrieve all documents 54 having a predetermined total number of weighted answers, as illustrated in column 536 of table 510. For example, module 50 may apply rules 508 to retrieve all documents 54 having at least twenty-five weighted answers matching in the query session performed by module 38. According to the information stored in table 510 of FIG. 11 and these rules 508, module 50 retrieves documents 542a and 542b.

Upon retrieving documents 54 from archive 52 based upon rules 508 and the information stored in table 510, module 50 communicates the retrieved documents 54 to module 30 using link 80. The knowledge worker may then use the information stored in a document 54 to perform one or more subprocesses of a knowledge module 32.

Figure 12:
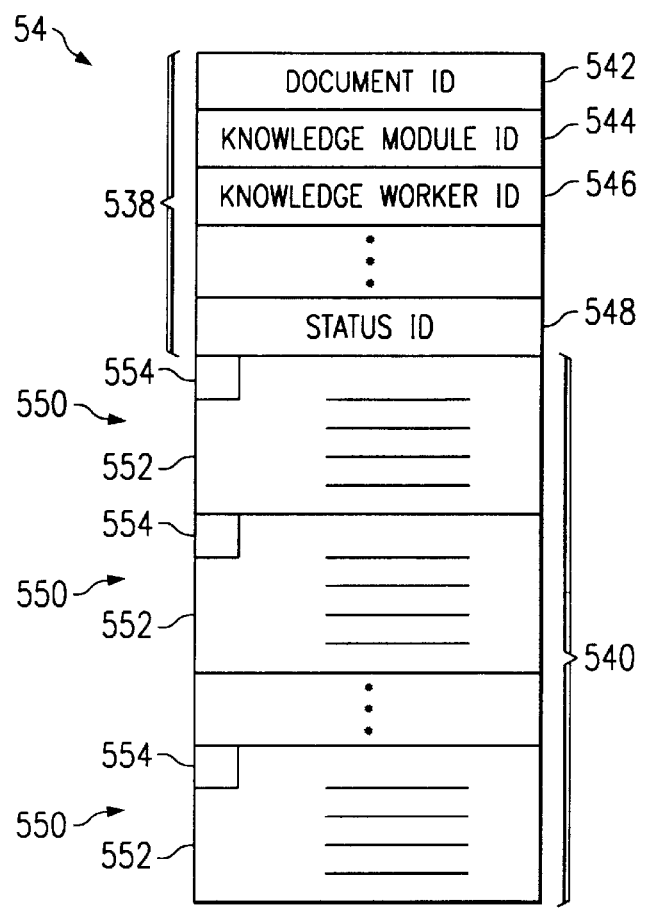
FIG. 12 illustrates one embodiment of a mindflow document of the system.

FIG. 12 illustrates an exemplary data structure for a mindflow document 54 used in system 10. Mindflow document 54 includes header information 538 and process information 540. Header information 538 contains a document identifier 542, a knowledge module identifier 544, a knowledge worker identifier 546, and a status identifier 548. Header information 538 may also include other information associated with a document 54, such as length and size information, compression information, error correction and recovery information, framing information, and any other information suitable to maintain and access document 54 in archive 52. Components of header information 538 may be before, after, or interspersed with process information 540.

Process information 540 comprises a number of subprocess intervals 550 before, after, or interspersed with header information 538. Each subprocess interval 550 includes subprocess information 552 and an associated subprocess identifier 554. Subprocess information 552 may comprise any suitable arrangement of information detailing the execution of a corresponding subprocess 84, identified by subprocess identifier 554, of a knowledge module 32, identified by knowledge module identifier 544, by a knowledge worker, identified by knowledge worker identifier 546.

For example, one subprocess 84 of a knowledge module 32 may perform a query session with a knowledge worker to collect information regarding the subject matter of the knowledge module 32. The query session may include a first group of questions to which the knowledge worker provides a plurality of first answers, and a second group of questions 138 to which the knowledge worker provides a plurality of second answers. Although this example is detailed with respect to a first group of questions and a second group of questions, it should be understood that the query session may include any number of groups of questions presented to the knowledge worker and any number of corresponding answers provided by the knowledge worker. Information 552 for this subprocess includes the questions 138 presented to the knowledge worker and the answers 140 provided by the knowledge worker in the query session. By storing information 552 associated with query sessions in documents 54, module 50 may intelligently retrieve documents 54 as described above with reference to FIGS. 10 and 11.

In another example, a subprocess 84 of the knowledge module 32 indicated by identifier 544 retrieves a plurality of knowledge items 46 from warehouse 44 and performs an evaluation session with the knowledge worker to determine a value index 176 for each retrieved knowledge item 46 based upon particular criteria associated with the knowledge module 32. In this embodiment, information 552 comprises information defining the evaluation session, including the value index 176 for each knowledge item 46, the criteria used to evaluate each knowledge item 46, and any other suitable information associated with the evaluation session. Although the description of subprocess information 552 is detailed above with reference to two functions of subprocesses 84, it should be understood that process information 540 includes subprocess information 552 for any number and types of subprocesses 84 of a knowledge module 32.

Document identifier 542 comprises any suitable addressing, referencing, or linking information used to identify document 54 to any other components of system 10. Knowledge module identifier 544 comprises any suitable addressing, referencing, or linking information used to identify the knowledge module 32 associated with the document 54. Knowledge worker identifier 546 comprises any suitable addressing, referencing, or linking information used to identify the knowledge worker that performed the knowledge module 32 indicated by identifier 544 resulting in the document 54 indicated by identifier 542.

Status identifier 548 comprises any suitable information used to indicate whether document 54 satisfies one or more rules 508 used to retrieve selected documents 54. In one embodiment, status identifier 548 indicates whether a predetermined number of the answers 140 stored in information 552 match the answers 140 provided by a knowledge worker performing the query session of information 552. For example, status identifier 548 indicates whether a predetermined number of answers of a query session in document 54 match the answers of a knowledge worker to a first group of questions in a query session performed by module 38, and a predetermined number of answers match the answers of the knowledge worker to the second group of questions in the query session performed by module 38.

Figure 13:
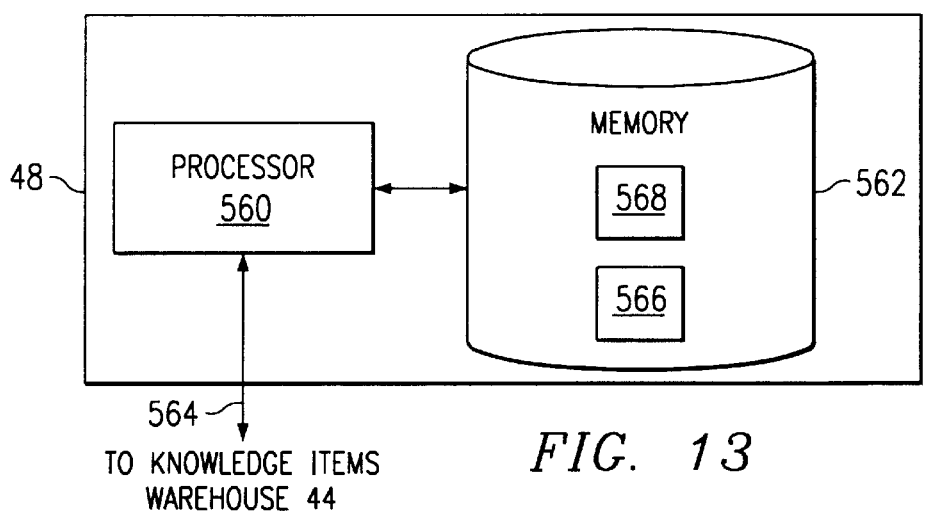
FIG. 13 illustrates one embodiment of a system administration module of the system.

FIG. 13 illustrates one embodiment of a system administration module 48 of system 10. Module 48 includes a processor 560 coupled to a memory 562. Processor 560 comprises any suitable combination of hardware and software in computer 60 to provide the described function or operation of system administration module 48. Processor 560 maintains a link 564 to knowledge items warehouse 44. Link 564 comprises any suitable communication path between the identified components.

Memory 562 comprises any suitable volatile or non-volatile memory device associated with computer 60. Memory 562 generally stores a number of files, lists, tables, or any other arrangement of information that supports the review of knowledge items 46 stored in knowledge items warehouse 44. For example, memory 562 includes knowledge item source table 566 and knowledge item status table 568. In general, module 48 performs a review session with a system administrator to review the integrity of knowledge items 46 stored in knowledge items warehouse 44 using the information stored in tables 566 and 568.

Figure 14:
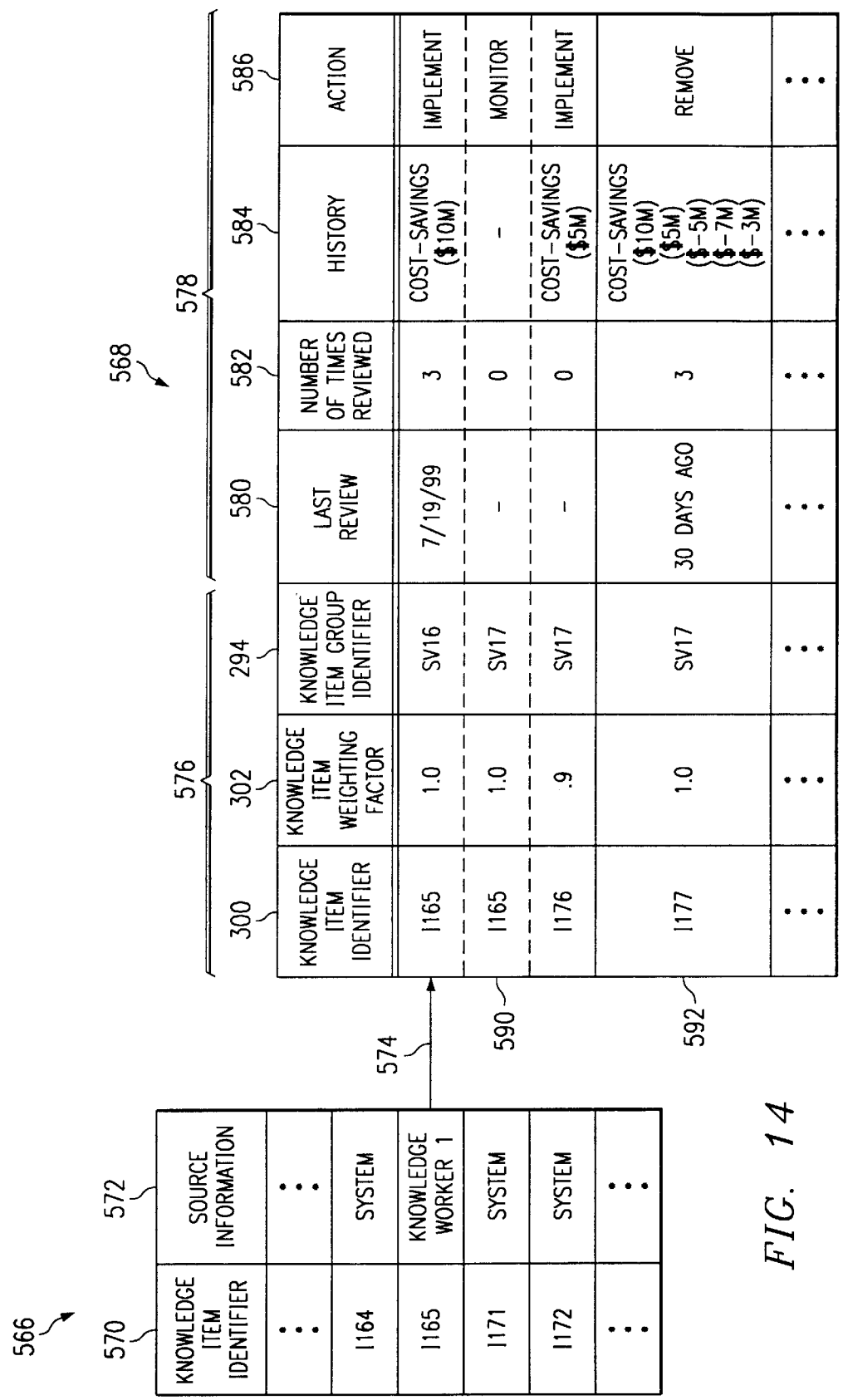
FIG. 14 illustrates exemplary information used by the system administration module.

FIG. 14 illustrates the structure and content of tables 566 and 568 stored in memory 562 of module 48. Knowledge item source table 566 includes a column 570 for knowledge item identifiers 300 and a column 572 for source information associated with a particular knowledge item 46. In general, the information stored in table 566 indicates whether a particular knowledge item 46, as indicated by knowledge item identifier 300 in column 570, was generated by a knowledge worker operating system 10, as indicated by the source information stored in column 572. If a particular knowledge item 46 was generated by a knowledge worker as indicated in column 572, a pointer 574 indexes a row of entries in knowledge item status table 568 as illustrated in FIG. 14. Although table 566 is illustrated as being stored in memory 562 of module 48, it should be understood that the information stored in table 566 may also be included in a table, a file, or any other arrangement of information stored in knowledge items warehouse 44.

Knowledge item status table 568 includes knowledge item information 576 and status information 578. Knowledge item information 576 includes knowledge item identifiers 300, knowledge item weighting factors 302, and knowledge item group identifiers 294. Status information 578 includes review session information 580 and 582, history information 584, and action information 586. Status information 578 is generally indexed by knowledge item information 576. Each mapping of a particular knowledge item 46 in warehouse 44, as indicated by knowledge item group identifiers 294, may include corresponding status information 578. For example, each instantiation of a knowledge item 46 identified by the identifier "I65" in table 568 and indexed by the knowledge item group identifiers 294 identified by "SV16" and "SV17" include corresponding status information 578. Therefore, one or more instantiations of a particular knowledge item 46 in warehouse 44 may be associated with status information 578.

Review session information 580 comprises any suitable information indicating the date that a corresponding knowledge item 46 was last reviewed by a system administrator, a period of time elapsed from the last review of a corresponding knowledge item 46, or any other suitable indicator of time indicating the last review of a corresponding knowledge item 46. Review session information 582 comprises any suitable information indicating the number of times a corresponding knowledge item 46 has been reviewed by a system administrator.

History information 584 comprises any suitable information indicating the knowledge module 32 associated with the generation of a knowledge item 46 by a knowledge worker, the positive or negative impact of a particular knowledge item 46 upon the execution of one or more knowledge modules 32, the frequency of use of a particular knowledge item 46 in one or more knowledge modules 32, and any other suitable information associated with the history of a knowledge item 46 implemented by a knowledge worker in system 10.

Action information 586 comprises any suitable recommendation offered by a system administrator based upon review of information stored in columns 576 and 578. For example, a system administrator may recommend implementing in one or more knowledge modules 32 a particular knowledge item 46 based upon the number of times the knowledge item 46 has been reviewed by a system administrator, the positive impact of the knowledge item 46 when implemented in a particular knowledge module 32, and any other information from table 568 or from the experience of the system administrator. In another example, a system administrator may recommend monitoring a particular knowledge item 46 until further review is performed. In yet another example, a system administrator may recommend removing a particular knowledge item 46 from knowledge items warehouse 44 based upon a negative impact upon a knowledge module 32 caused by knowledge item 46.

In operation, processor 560 performs a review session with a system administrator to review and maintain the integrity of knowledge items 46 generated by knowledge workers and stored in knowledge items warehouse 44. During the review session, a system administrator may access the information stored in tables 566 and 568 and make modifications and directives based upon this information. Referring to the row of entries in table 568 identified by pointer 574, for example, a system administrator may determine that because the knowledge item 46 has generated ten million dollars worth of cost savings in a prior execution of cost-savings module 32, and because the knowledge item has been reviewed three times by prior system administrators, that the knowledge item 46 should be implemented by knowledge workers in the execution of future knowledge modules 32. Other indicators of success may also be included in the history information 584, such as the ability to readily implement a particular knowledge item 46 in a knowledge module 32.

Based upon the positive history of the knowledge item 46 as indicated by history information 584, the system administrator may also determine that the knowledge item 46 should be included in multiple knowledge item groups and may therefore associate the knowledge item 46 with an additional knowledge item group identifier 294 as illustrated by the dashed entry in row 590 of table 568. Because the knowledge item 46 indicated by row 590 was stored in knowledge items warehouse 44 associated with a different knowledge item group identifier 294, there is initially no review session information 580 or 582 or history information 584 for this instantiation of knowledge item 96. In this instance, a system administrator may include a directive in the action information to monitor the use of the knowledge item 46 until a more meaningful review can be made.

Referring to the knowledge item 46 indicated by row 592, a system administrator may determine that the knowledge item 46 should be removed from warehouse 44 based upon the number of times the knowledge item 46 was previously reviewed and the negative effect of implementing the knowledge item 46 in a particular knowledge module 32. For example, as illustrated in row 592 of table 568, history information 584 of knowledge item 46 indicates that in the three most recent implementations of knowledge item 46 in the cost-savings module 32, the organization of the knowledge worker suffered a cost increase rather than a cost savings. In this instance, the system administrator may remove this particular instantiation of knowledge item 46 from warehouse 44. Other indicators may also suggest to the system administrator that a particular instantiation of a knowledge item 46 should be removed from warehouse 44. For example, a particular instantiation of a knowledge item 46 may not be readily implemented by a knowledge module 32, or the knowledge item 46 may no longer be feasible.

A system administrator may modify the knowledge item information stored in column 576 based upon status information 578 to maintain the integrity of knowledge items 46. For example, the system administrator may modify the knowledge item weighting factors 302 of a particular knowledge item 46 to modify the relative impact of knowledge item 46 in the execution of a knowledge module 32. Furthermore, a system administrator may modify the association of a knowledge item 46 with a knowledge item group identifier 294 to modify the mapping of a knowledge item 46 in warehouse 44. By modifying the association of a knowledge item 46 with an identifier 294, a system administrator may modify the accessability of the knowledge item 46 by module 38. For example, a system administrator may remove any association between a knowledge item 46 and a knowledge item group identifier 294 so that the knowledge item 46 is effectively removed from knowledge item warehouse 44. Moreover, a system administrator may add an association between a knowledge item 46 and a knowledge item group identifier 294 to increase the visibility of a knowledge item 46 to knowledge workers of system 10.

Figure 15:
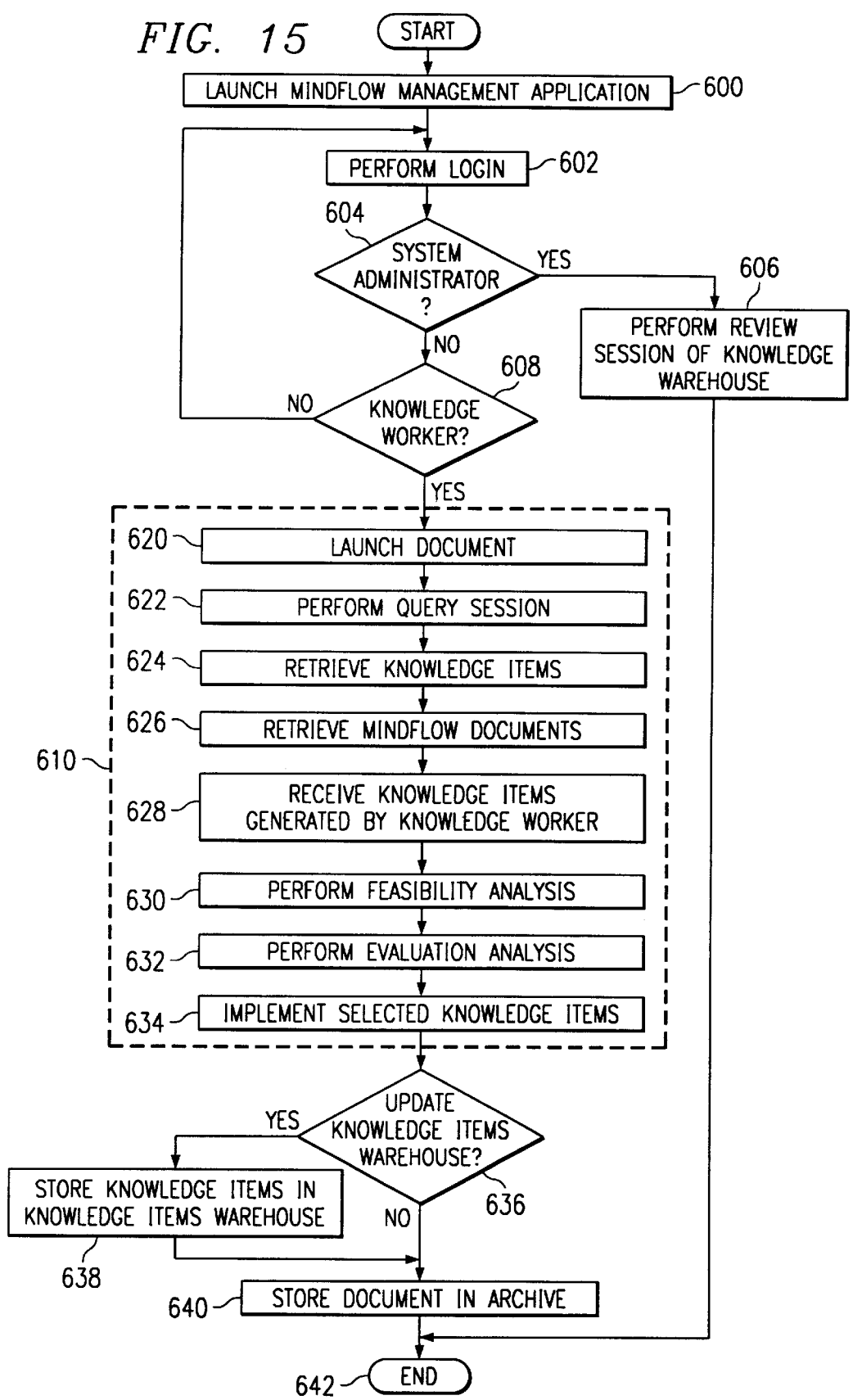
FIG. 15 illustrates a flowchart of an exemplary method for performing a mindflow process using the system.

FIG. 15 illustrates a flowchart of an exemplary method for performing a mindflow process using system 10. System 10 launches mindflow management application 16 at step 600, and performs a login of the user at step 602. In particular, system 10 collects and verifies a user name and user password to determine the type of user and security level of the user. System 10 determines whether the user is accessing system 10 as a system administrator at step 604. If the user is accessing system as a system administrator, system 10 performs a review session of knowledge items 46 in warehouse 44 with the system administrator at step 606.

The process of performing the review session described with reference to step 606 is described in greater detail below with reference to FIG. 20. In general, the system administrator reviews each knowledge item 46 stored in warehouse 44 that was generated by a knowledge worker, and determines the integrity of the knowledge items 46 based upon associated status information 578. If necessary, the system administrator may remove a knowledge item 46 from warehouse 44; issue a recommendation to implement the knowledge item 46 in one or more knowledge modules 32; or modify the text, the weighting factor, or the indexing scheme of the knowledge item 46 based upon the associated status information 578.

If the user is not accessing system 10 as a system administrator, as determined at step 604, system 10 determines whether the user is accessing system 10 as a valid knowledge worker at step 608. If not, system 10 may determine that the user performed an invalid login procedure and execution returns to step 602. If so, execution proceeds to steps 610 where system 10 executes a particular knowledge module 32 selected by the knowledge worker to perform an associated business task.

System 10 manages the mindflow of the knowledge worker performing the business task of the selected knowledge module 32 using graphical user interface 72. In particular, system 10 initiates a number of displays of GUI 72 operated by the knowledge worker to perform each of subprocesses 84 of the selected knowledge module 32. Although steps 610 are described with reference to a cost-savings knowledge module 32 selected by the knowledge worker, it should be understood that system 10 may execute any suitable knowledge module 32 to perform any suitable business task of an organization.

A cost-savings knowledge module 32 includes subprocesses 84 designed to collect information from the knowledge worker; analyze the collected information to identify potential cost-savings opportunities for the organization of the knowledge worker; determine the feasibility of and evaluate the identified cost-savings opportunities; execute selected cost-savings opportunities using selected business tools; accumulate cost-savings opportunities developed by the knowledge worker; and implement the cost-savings opportunities in the cost-savings knowledge module 32.

System 10 stores the execution of a knowledge module 32 by a knowledge worker in an associated mindflow document 54. While the execution of the knowledge module 32 is incomplete, it is stored in a working mindflow document 54. Upon complete execution of a knowledge module 32, the working document 54 is stored in archive 52 as an archive mindflow document 54. Therefore, system 10 launches an appropriate working document 54 at step 620 depending upon the status of execution of knowledge module 32 by the knowledge worker. In particular, if the knowledge worker is resuming execution of a particular knowledge module 32, then system 10 launches a working document 54 and resumes execution of a particular subprocess 84 corresponding to the function of a particular step 620 through step 624 in steps 610. If the knowledge worker is initiating the execution of knowledge module 32, then system 10 creates and launches a new working document at step 620.

System 10 performs a query session with the knowledge worker at step 622 to collect information from the knowledge worker. The process of performing the query session described with reference to step 622 is described in greater detail below with reference to FIG. 16. In general, system 10 presents to the knowledge worker questions 138 according to the subject matter of the selected knowledge module 32 and/or in response to answers 140 provided by the knowledge worker to previous questions 138. The knowledge worker provides answers 140 to questions 138 to provide information regarding the execution of the selected knowledge module 32.

System 10 retrieves knowledge items 46 from knowledge warehouse 44 at step 624. The process of retrieving knowledge items 46 described with reference to step 624 is described in greater detail below with reference to FIG. 16. In general, system 10 retrieves knowledge items 46 from knowledge items warehouse 44 based upon the results of the query session described above with reference to step 622. System 10 then selects a portion of the retrieved knowledge items 46 for presentation to the knowledge worker. In this example, the knowledge items 46 presented to the knowledge worker may comprise potential cost-savings opportunities for the organization of the knowledge worker.

In addition to retrieving knowledge items 46, system 10 retrieves mindflow documents 54 from archive 52, at step 626. The process of retrieving mindflow documents 54 described with reference to step 626 is described in greater detail below with reference to FIG. 17. In general, system 10 retrieves those documents 54 most relevant to the business issues faced by the knowledge worker as determined by the query session performed at step 622. In this example, system 10 may retrieve those documents 54 most relevant to the cost-savings issues faced by the knowledge worker performing cost-savings module 32. Because archive 52 stores documents 54 according to identifiers associated with the business tasks or objectives of knowledge module 32, system 10 may intelligently retrieve relevant documents 54 for presentation to the knowledge worker.

In one embodiment, the knowledge worker may develop a new knowledge item 46, such as a new cost-savings opportunity to implement in the cost-savings knowledge module 32. In this embodiment, system 10 receives knowledge items 46 generated by the knowledge worker at step 628. As described below with reference to step 636, a knowledge item 46 developed by a knowledge worker may be stored in knowledge items warehouse 44.

System 10 performs a feasibility analysis of knowledge items 46 at step 630. To determine the feasibility of an identified potential cost-savings opportunity, for example, system 10 distributes the retrieved knowledge items 46 to particular management knowledge workers of system 10, such as management executives within the organization of the knowledge worker. Management knowledge workers approve or disapprove of the use of each proposed cost-savings opportunity in the execution of the cost-savings knowledge module 32. System 10 performs the feasibility analysis for knowledge items 46 generated by a knowledge worker-as well as those retrieved from knowledge items warehouse 44 based upon the results of the query session.

System 10 performs an evaluation analysis of the knowledge items 46, such as those approved by the management knowledge workers, at step 632. In general, system 10 determines a number of relevant parameters 172 associated with the selected knowledge module 32 and assigns a weighting factor to each parameter 172. It should be understood that any number and combination of parameters 172 associated with the selected knowledge module 32 may be used to evaluate the knowledge items 46. Examples of parameters 172 associated with the cost-savings knowledge module 32, may include the estimated savings of the cost-savings opportunity, the research and development resources to be spent on the cost-savings opportunity, and the time required to implement the cost-savings opportunity. System 10 assigns a weighting factor to each parameter 172 based upon the relevance of each parameter 172 to the business task of the selected knowledge module 32. System 10 then determines a prioritization of the parameters 172 for each knowledge item 46 based on the input of the knowledge worker, such as parameter values 174. Next, system 10 determines a value index 176 for each knowledge item 46 based upon the weighting factor of each parameter 172 and the prioritization of the parameters for each knowledge item 46. At this point, a knowledge worker may select one or more knowledge items 46, such as cost-savings opportunities, to implement in the execution of the selected knowledge module 32. A knowledge worker typically selects particular knowledge items 46 based upon the associated value index 176 determined by system 10.

System 10 implements selected knowledge items 46 in the execution of the selected knowledge module 32 at step 634. In general, system 10 selects a number of business tools to be operated by the knowledge worker to execute the selected knowledge module 32 based upon the knowledge items 46 selected by the knowledge worker. For example, system 10 may select one or more particular spreadsheet applications, word-processing applications, optimization applications, or any other suitable software applications operated by the knowledge worker to execute the cost-savings knowledge module 32 based upon the cost-savings opportunities selected by the knowledge worker.

System 10 determines whether to update knowledge items warehouse 44 at step 636 based upon input of the knowledge worker. If so, system 10 stores knowledge items 46 generated by a knowledge worker in knowledge warehouse 44. The process of storing knowledge items 46 in knowledge warehouse 44 described with reference to step 638 is described in greater detail below with reference to FIG. 19. In general, system 10 performs a second query session with the knowledge worker, and stores the new knowledge items 46 in warehouse 44 indexed according to the results of the second query session. In this respect, system 10 maps the new knowledge items 46 into warehouse 44 such that the knowledge item 46 may be later retrieved by knowledge workers using the retrieval techniques described above with regard to FIGS. 4 and 5. If knowledge warehouse 44 is not to be updated as determined at 636, execution proceeds to step 640 where system 10 stores in archive 52 a mindflow document 54 that details the execution of the knowledge module 32 executed in steps 610.

Figure 16:
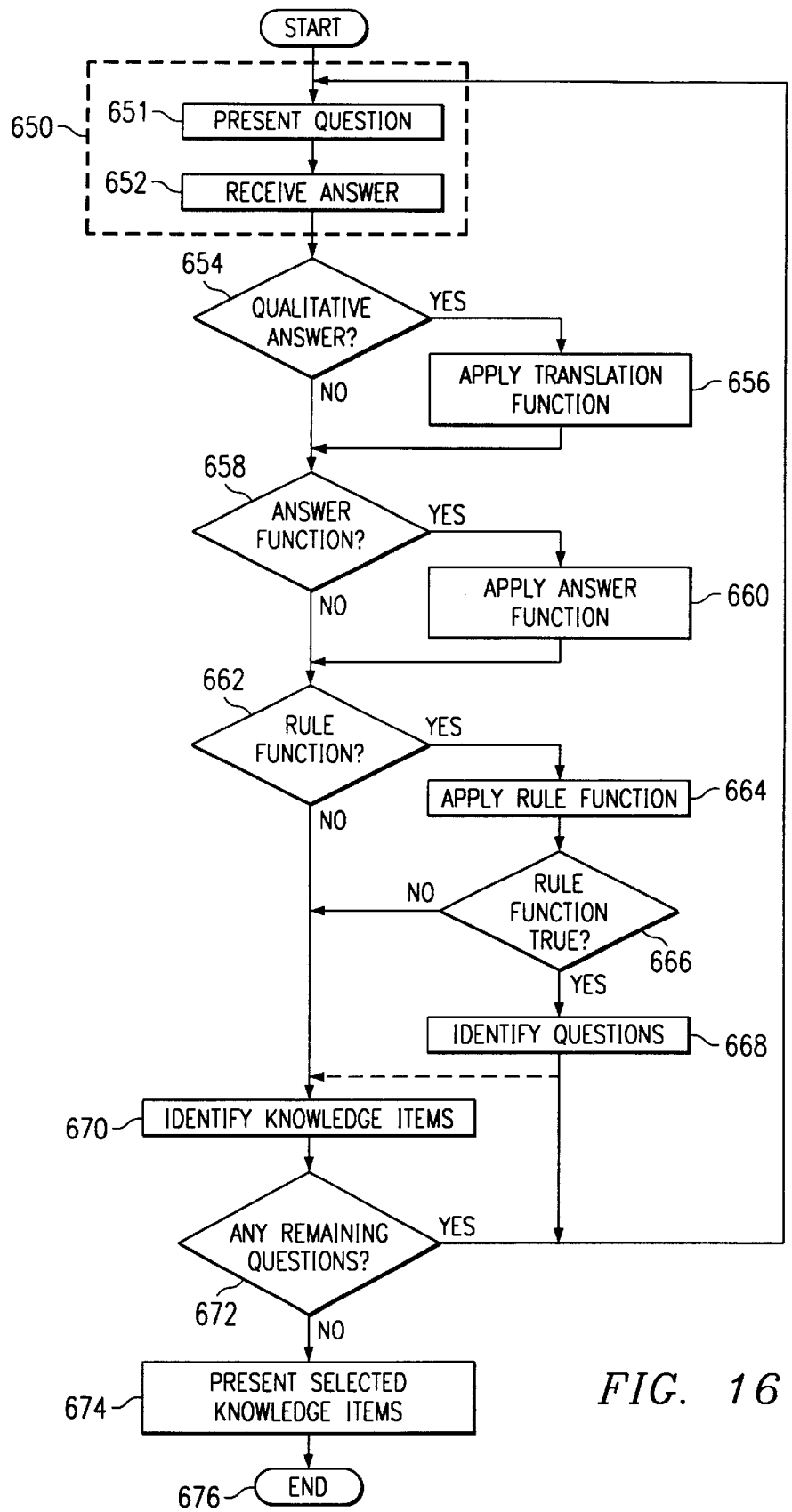
FIG. 16 illustrates a flowchart of an exemplary method for retrieving knowledge items from a knowledge items warehouse of the system.

FIG. 16 illustrates a flowchart of an exemplary method for retrieving knowledge items 46 from knowledge items warehouse 44 of system 10. In particular, the flowchart illustrated in FIG. 16 describes in more detail steps 622 and 624 of the flowchart illustrated in FIG. 15. The method begins at steps 650 where knowledge item retrieval module 38 performs an interactive query session with a knowledge worker executing a selected knowledge module 32. Module 38 presents questions 138 to the knowledge worker at step 651. In particular, module 38 presents independent questions 138 to a knowledge worker at the beginning of a query session, and presents dependent questions 138 to the knowledge worker in response to an answer 140 to a prior question 138. Module 38 receives answers 140 from the knowledge worker at step 652. In general, answers 140 may comprise qualitative answers or quantitative answers to a particular question 138.

Module 38 determines whether the answer 140 provided by the knowledge worker is a qualitative answer at step 654. If so, execution proceeds to step 656 where module 38 applies to answer 140 any suitable function that translates answer 140 from a qualitative answer 312 to a quantitative answer 314. If answer 140 is not a qualitative answer 312 as determined at step 654, or if module 38 has applied the translation function at step 656, execution proceeds to step 658 where module 38 determines whether answer 140 is associated with an answer function 320.

If answer 140 is associated with an answer function 320 as determined at step 658, execution proceeds to step 660 where module 38 applies a suitable answer function 320 to answer 140. An answer function 320 comprises any suitable mathematical formula that operates upon one or more answers 140 provided by the knowledge worker and/or any other value stored as data items 36 in data warehouse 34. Module 38 generally applies an answer function 320 to an answer 140 to condition the answer 140 for subsequent application of a rule function 262. If no answer function 320 is associated with the answer 140 as determined at step 658, or upon applying the answer function 320 at step 660, execution proceeds to step 662 where module 38 determines whether the answer 140 provided by the knowledge worker to question 138 is associated with a rule function 262.

If the answer 140 is not associated with a rule function 270 as determined at step 662, then execution proceeds to step 670. If answer 140 is associated with a rule function 270, then execution proceeds to step 664 where module 38 applies a rule function 270 to the answer 140. In one embodiment, a rule function 270 includes an initial value 272, an operator 274, and a discriminant 276. The initial value 272 comprises a default value for the result of the rule function 270. The operator 274 comprises any suitable operation that may be applied to an associated answer 140. The discriminant 276 comprises any suitable value with which an associated answer 140 is compared during the application of a rule function 270. In one embodiment, if an answer 140 satisfies a rule function 270 as determined by the operator 274 and the discriminant 276 of the rule function 270, then the results of the rule function 270 is true. If an answer 140 fails to satisfy an associated rule function 270, then the result of the rule function 270 is false.

Module 38 determines whether the result of rule function 270 is true at step 666. If not, execution proceeds to step 670. If so, execution proceeds to step 668 where module 38 identifies one or more dependent questions 138 for presentation to the knowledge worker, using the techniques described above with regard to FIGS. 4 and 5. Execution then returns to steps 650 where module 38 continues the query session.

In a particular embodiment of the present invention, module 38 may identify knowledge items 46 even though it also identifies dependent questions 138 for presentation to the knowledge worker. In this embodiment, subsequent to identifying questions 138 at step 668 and simultaneous to executing steps 650, execution proceeds to step 670. Module 38 identifies knowledge items 46 for presentation to the knowledge worker at step 670 using the techniques described above with reference to FIGS. 4 and 5. In general, module 38 identifies a knowledge item 46 based upon a particular question 138 presented to the knowledge worker and the answer 140 provided in response by the knowledge worker.

Module 38 determines whether any questions 138 remain to be presented to the knowledge worker at step 672. If so, execution returns to steps 650 where module 38 continues performing the query session. If not, execution proceeds to step 674 where module 38 selects knowledge items 46 to present to the knowledge worker. The process of selecting knowledge items 46 to present to the knowledge worker described with reference to step 674 is described in greater detail below with reference to FIG. 17. In general, module 38 operates with module 40 to select knowledge items 46 according to weighting factors associated with the questions 138 presented to the knowledge worker during the query session, the answers 140 provided by the knowledge worker, and the knowledge items 46 identified at step 670. In this respect, modules 38 and 40 present the most relevant knowledge items 46 to the knowledge worker. Execution terminates at step 676.

Figure 17:
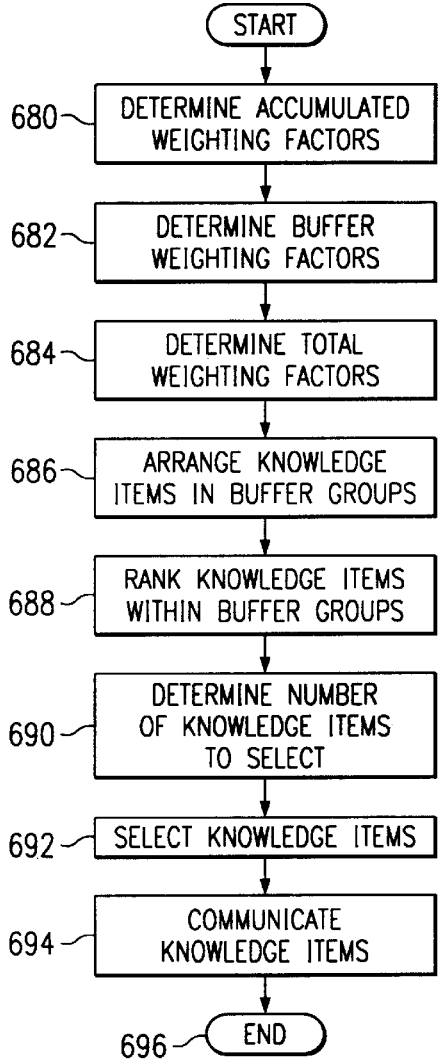
FIG. 17 illustrates a flowchart of an exemplary method for selecting knowledge items to present to a knowledge worker of the system.

FIG. 17 illustrates a flowchart of an exemplary method for selecting knowledge items 46 to present to a knowledge worker of system 10. In particular, the flowchart illustrated in FIG. 17 describes in more detail step 674 of the flowchart illustrated in FIG. 16. The method begins at step 680 where module 40 determines an accumulated weighting factor for each knowledge item 46 retrieved by module 38 from warehouse 44, using the accumulation techniques discussed above with reference to FIGS. 4 and 5. In general, an accumulated weighting factor comprises a function of each intermediate weighting factor gathered by module 38 associated with the retrieval of a corresponding knowledge item 46. In a particular embodiment, module 40 multiplies together each of the intermediate weighting factors gathered by module 38 to determine the accumulated weighting factor for the knowledge item 46. For example, an accumulated weighting factor for a particular knowledge item 46 may comprise a function of the question weighting factors 252, question group weighting factors 280, knowledge item group weighting factors 292, and knowledge item weighting factors 302 gathered by module 38 while retrieving a particular knowledge item 46.

Execution proceeds to step 682 where module 40 determines one or more buffer weighting factors for each knowledge item 46 retrieved by module 38. In general, module 48 determines the buffer weighting factors according to rules 326 associated with module 40. Execution then proceeds to step 684 where module 40 determines one or more total weighting factors for each knowledge item 46 retrieved by module 38 as a function of the accumulated weighting factors determined at step 680 and the buffer weighting factors determined at step 682.

Module 40 arranges knowledge items 46 retrieved by module 38 in one or more buffer groups at step 686 according to rules 326 associated with module 40. In general, each buffer group comprises an association of knowledge items 46 determined according to one or more business models embodied in rules 326. Module 40 then ranks knowledge items 46 within each buffer group at step 688 according to the total weighting factors for each knowledge item 46 determined at step 684.

Module 40 determines the number of knowledge items 46 to select from each buffer group according to rules 326 at step 690. For example, module 40 may determine that three knowledge items 46 should be selected from a first buffer group and that five knowledge items 46 should be selected from a second buffer group. Module 40 selects the determined number of knowledge items 46 from each buffer group at step 692 according to the ranking of knowledge items 46 within each buffer group as determined at step 688. Therefore, for example, module 40 may select from the first buffer group the three knowledge items 46 having the highest total weighting factors, and from the second buffer group the five knowledge items 46 having the highest total weighting factors. Module 40 communicates the selected knowledge items 46 to mindflow management module 30 at step 694 for presentation to the knowledge worker. Execution terminates at step 696.

Figure 18:
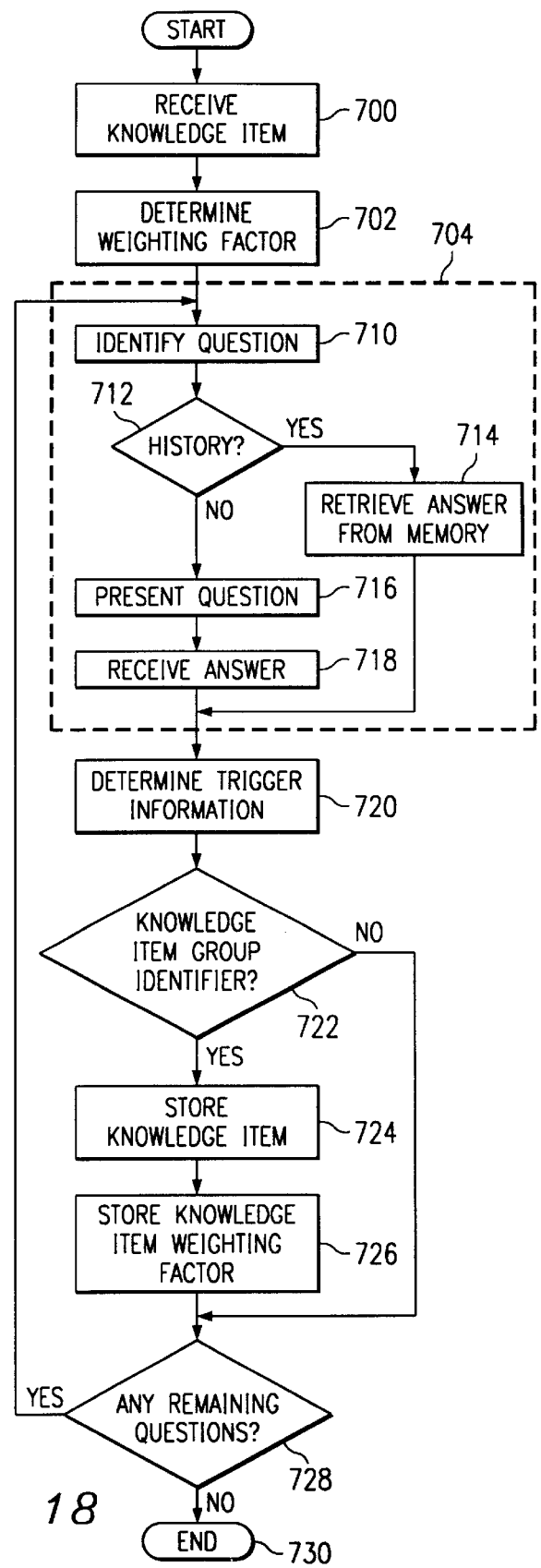
FIG. 18 illustrates a flowchart of an exemplary method for accumulating knowledge items in the knowledge items warehouse of the system.

FIG. 18 illustrates a flowchart of an exemplary method for accumulating knowledge items 46 generated by a knowledge worker in knowledge items warehouse 44 of system 10. In particular, the flowchart illustrated in FIG. 18 describes in more detail step 638 of the flowchart illustrated in FIG. 15. The method begins at step 700 where module 42 receives a knowledge item 46 from a knowledge worker of system 10. Generally, a knowledge item 46 to be stored in warehouse 44 was generated by a knowledge worker and implemented in one or more knowledge modules 32 with a measure of success. Module 42 determines a knowledge item weighting factor 302 for knowledge item 46 at step 702. Module 42 generally determines a knowledge item weighting factor 302 based upon any relevant business factors or criteria affecting the organization of the knowledge worker, such as the relative impact of the knowledge item 46 upon the execution of the selected knowledge module 32 by the knowledge worker.

Execution proceeds to steps 704 where module 42 performs a query session with the knowledge worker to determine the appropriate mapping of the knowledge item 46 in knowledge items warehouse 44. In particular, module 48 identifies a question 138 to present to the knowledge worker at step 710. Execution proceeds to step 712 where module 42 determines whether the identified question 138 was previously presented to the knowledge worker in a previous query session either associated with knowledge item retrieval module 38 or knowledge item accumulation module 42. If so, execution proceeds to step 714 were module 42 retrieves the answer 140 previously provided by the knowledge worker. If not, execution proceeds to step 716 where module 42 presents the identified question 138 to the knowledge worker. Generally, module 42 presents an independent question 138 to a knowledge worker at the beginning of a query session, and presents a dependent question 138 to the knowledge worker in response to an answer 140 to a prior question 138. Module 42 receives an answer 140 to the presented question 138 at step 718.

Upon receiving an answer 140 at step 718 or upon retrieving an answer 140 from memory at step 714, execution proceeds to step 720 where module 42 determines the appropriate trigger information 398 associated with question 138 and answer 140. The trigger information 398 determined at step 720 may comprise a question identifier 240, a knowledge item group identifier 294, or both. Module 42 determines whether the trigger information 398 comprises a knowledge item group identifier 294 at step 722. If so, execution proceeds to step 724 where module 42 stores the knowledge item 46 in knowledge items warehouse 44 indexed by the determined knowledge item group identifier 294. At step 726, module 42 stores in knowledge items warehouse 44 the knowledge item weighting factor 302 associated with knowledge item 46, determined at step 702.

Upon storing knowledge item 46 and knowledge item weighting factor 302 in warehouse 44 at steps 724 and 726, respectively, or upon determining that the trigger information 398 does not comprise a knowledge item group identifier 294 at step 722, execution proceeds to step 728. Module 42 determines whether any questions 138 remain to be presented to the knowledge worker at step 728. In particular, the query session performed by module 42 with the knowledge worker may comprise further independent questions 138 to be presented to the knowledge worker. In addition, the trigger information 398 determined at step 720 may comprise information identifying dependent questions 138 to be presented to the knowledge worker. If a question 138, whether independent or dependent, remains to be presented to knowledge worker as determined at step 728, execution returns to steps 704. If not, execution terminates at step 730.

Figure 19:
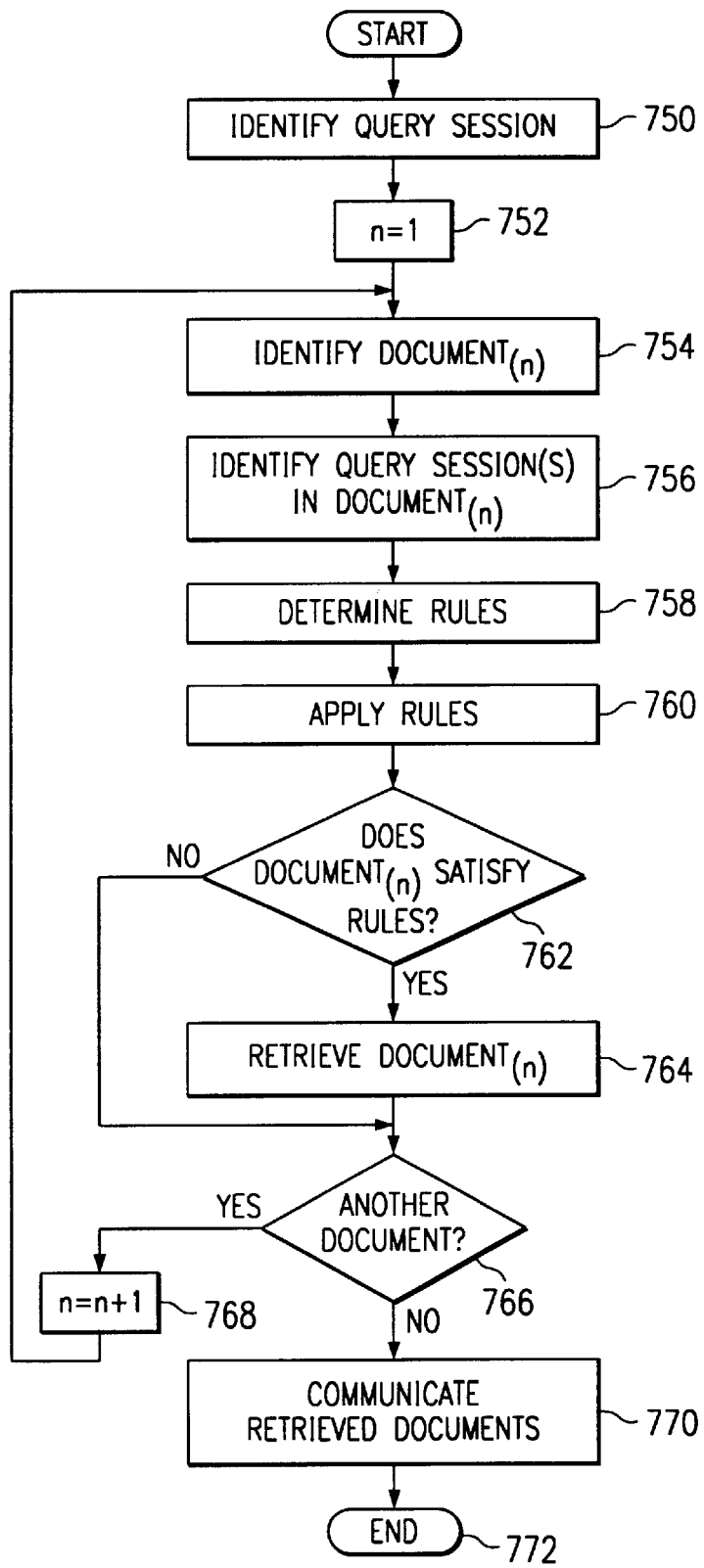
FIG. 19 illustrates a flowchart of an exemplary method for retrieving mindflow documents from a mindflow document archive of the system.

FIG. 19 illustrates a flowchart of an exemplary method for retrieving mindflow documents 54 from mindflow document archive 52 of system 10. In particular, the flowchart illustrated in FIG. 19 describes in more detail step 626 of the flowchart illustrated in FIG. 15. The method begins at step 750 where mindflow document retrieval module 50 identifies a query session performed by module 38 with a knowledge worker. The query session identified at step 750 may include any number of groups of questions 138 presented to the knowledge worker and corresponding answers 140 received from the knowledge worker. Module 50 initializes a counter, n, to one at step 752. Module 50 identifies a document$_{(n)}$ at step 754 using a document identifier 542. Module 50 identifies a query session stored in document$_{(n)}$ at step 756. The information associated with the query session of document$_{(n)}$ may or may not be associated with the same knowledge module 32 as that of the query session identified at step 750.

Module 50 retrieves from memory 502 rules 508 used to select one or more documents 54 for retrieval based upon a comparison of results between the query session stored in documents 54 and the query session identified at step 750. Module 50 applies rules 508 at step 760. For example, a first rule 508 may determine that module 50 will retrieve a particular document 54 if that document 54 includes a predetermined number of answers in a query session that match the answers provided by the knowledge worker to a particular group of questions in the query session identified at step 750. Other rules 508 are described in greater detail with reference to FIGS. 10 and 11. Module 50 may apply any number and combination of rules 508 at step 760 to determine the appropriate documents 54 that will be retrieved.

Module 50 determines whether document$_{(n)}$ satisfies the applied rules 508 at step 762. If so, module 50 retrieves document$_{(n)}$ at step 764. If document$_{(n)}$ does not satisfy rules 508 as determined at step 762, or if module 50 retrieves document$_{(n)}$ at step 764, execution proceeds to step 766, where module 50 determines whether another document 54 stored in archive 52 is to be examined. If so, execution proceeds to step 768 where module 50 increments the counter, n, by one and returns execution to step 754. If not, execution proceeds to step 770 where module 50 communicates all retrieved documents 54 to mindflow management module 30. Execution terminates at step 772.

Figure 20:
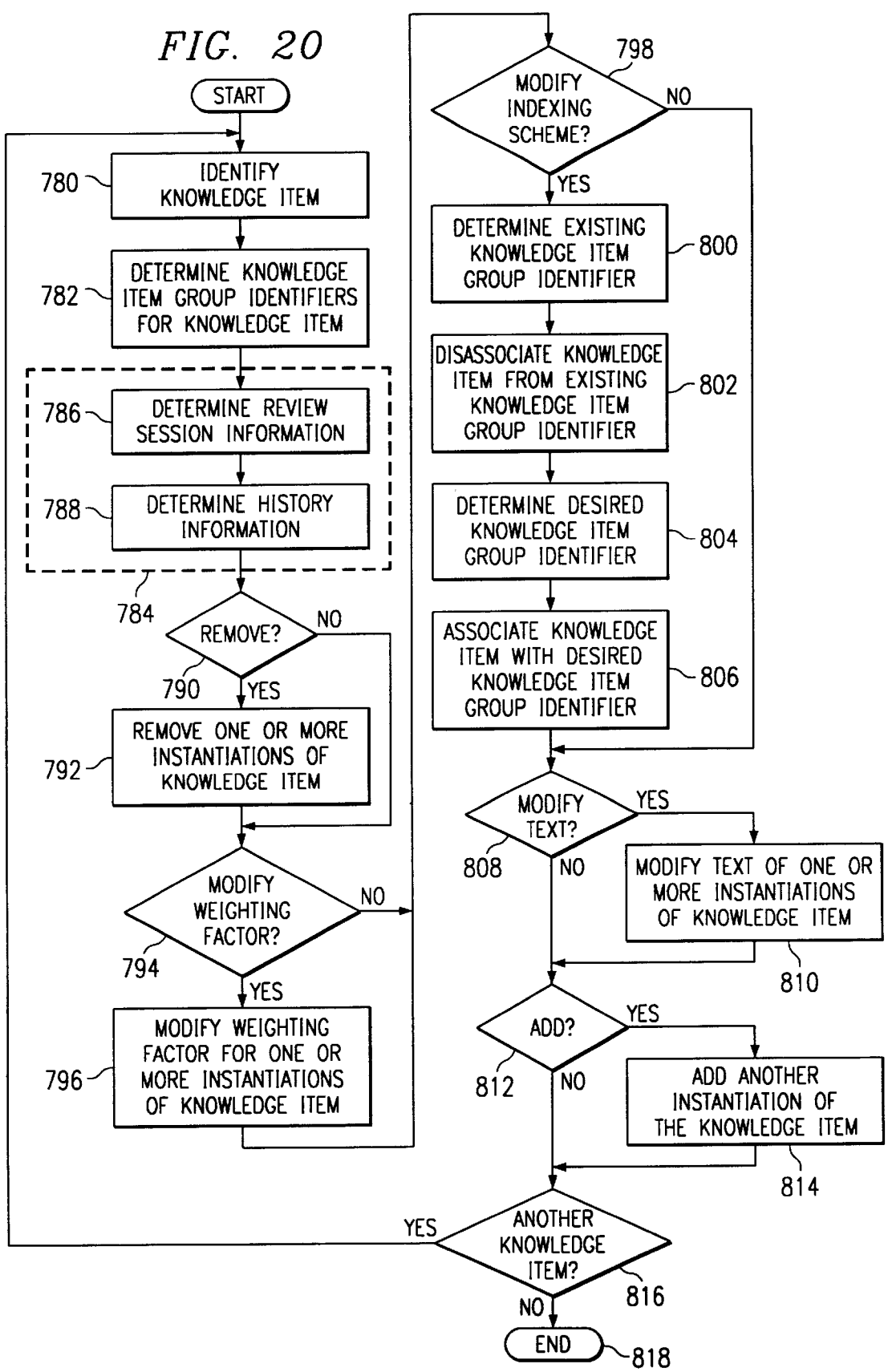
FIG. 20 illustrates a flowchart of an exemplary method for performing a review session of knowledge items stored in the knowledge items warehouse of the system.

FIG. 20 illustrates a flowchart of an exemplary method for performing a review session of knowledge items 46 in knowledge items warehouse 44 of system 10. In particular, the flowchart illustrated in FIG. 20 describes in more detail step 606 of the flowchart illustrated in FIG. 15. The method begins at step 780 where module 48 identifies in warehouse 44 a particular knowledge item 46 generated by a knowledge worker. Generally, a flag, a pointer, or any other suitable source information 572 may be associated with a knowledge item 46 to indicate that it was generated by a knowledge worker. Each knowledge item 46 stored in warehouse 44 is associated with one or more knowledge item group identifiers 294 to facilitate retrieval of the knowledge item 46 using the retrieval techniques described above with references to FIGS. 4 and 5. Module 48 determines the knowledge item group identifiers 294 of each knowledge item 46 identified at step 780, at step 782. Therefore, warehouse 44 may store multiple instantiations of a knowledge item 46.

Module 48 determines status information 578 associated with a particular instantiation of knowledge item 46 at steps 784. In particular, module 48 determines review session information 580 and 582 associated with the knowledge item 46, at step 786. The review session information 582 may include any suitable indicator of time identifying the last review of the knowledge item 46 by a system administrator, and the number of times that the knowledge item 46 has been reviewed by a system administrator. Module 48 also determines history information 584 associated with the knowledge item 46, at step 788. The history information 584 may include information indicating the knowledge module 32 being executed when the knowledge item 46 was generated by the knowledge worker. The history information 584 may further include information quantifying the positive or negative impact of a particular knowledge item 46 upon the execution of one or more knowledge modules 32, and the frequency of use of a particular knowledge item 46 in the knowledge modules 32.

Based upon status information 578 associated with a particular knowledge item 46, a system administrator may remove a knowledge item 46 from warehouse 44; modify the text, the weighting factor 302, or the indexing scheme of the knowledge item 46 stored in warehouse 44; and/or add a new indexing scheme for the knowledge item 46 in warehouse 44. In this regard, module 48 determines whether to remove one or more instantiations of knowledge item 46 from knowledge items warehouse 44 at step 790, based upon input of the system administrator. In this respect, if one instantiation of a knowledge item 46 associated with a particular knowledge item identifier 294 results in a negative impact upon the execution of a knowledge module 32, then it may be removed whereas another instantiation of the knowledge item 46 associated with another knowledge item identifier 294 that results in a positive impact upon the execution of a knowledge module 32 may remain in warehouse 44. If a knowledge item 46 is to be removed as determined at step 790, execution proceeds to step 792 where module 48 removes the appropriate instantiation of the knowledge item 46 from warehouse 44. If the knowledge item 46 is not to be removed from warehouse 44 as determined at step 790, or if one or more instantiations of the knowledge item 46 are removed at step 792, execution proceeds to step 794.

Module 48 determines whether to modify the weighting factor 302 for one or more instantiations of a knowledge item 46 at step 794. If so, execution proceeds to step 796 where module 48 modifies the knowledge item weighting factor 302 of the identified instantiation of the knowledge item 46. It should be understood that while module 48 may modify the weighting factor 302 for one instantiation of a knowledge item 46 associated with a first knowledge item identifier 294, module 48 may maintain the existing weighting factors 302 for other instantiations of the knowledge item 46 associated with other knowledge item group identifiers 294. If the weighting factor 302 of a particular knowledge item 46 is not to be modified as determined at step 794, or after modifying the weighting factor 302 at step 796, execution proceeds to step 798.

Module 48 determines whether to modify the indexing scheme of a particular instantiation of a knowledge item 46 at step 798. In particular, module 48 determines whether to modify the association of a particular knowledge item 46 with a particular knowledge item group identifier 294. If module 48 is to modify the indexing scheme of the knowledge item 46, as determined at step 798, then execution proceeds to step 800 where module 48 determines the existing knowledge item group identifier 294 of the particular instantiation of the knowledge item 46 to be modified. Module 48 disassociates the knowledge item 46 with the existing knowledge item group identifier 294 at step 802. Execution then proceeds to step 804 where module 48 determines the desired knowledge item group identifier 294 of the particular instantiation of the knowledge item 46 to be modified. Module 48 associates the knowledge item 46 with the desired knowledge item group identifier 294 at step 806. By modifying the association of a knowledge item 46 with a particular knowledge item group identifier 294, module 48 modifies the accessability of knowledge item 46 by module 38. If the indexing scheme of knowledge item 46 was not to be modified as determined at step 798, or upon modifying the indexing scheme at steps 800–804, execution proceeds to step 808.

Module 48 determines whether to modify the text of a particular instantiation of a knowledge item 46 at step 808. If so, execution proceeds to step 810 where module 48 modifies the text of the appropriate instantiation of knowledge item 46 according to input of the system administrator. In this regard, a system administrator may refine the idea or solution presented by the knowledge item 46 to knowledge workers operating system 10. If the text of a knowledge item 46 was not to be modified, as determined at step 808, or if the text was modified at step 810, then execution proceeds to step 812.

Module 48 determines whether to add another instantiation of knowledge item 46 to knowledge items warehouse 44 at step 812. If so, execution proceeds to step 814 where module 48 stores in warehouse 44 another instantiation of knowledge item 46 associated with another knowledge item group identifier 294. By doing so, module 48 increases the visibility of knowledge item 46 to knowledge workers of system 10. If another instantiation of knowledge item 46 is not to be added to warehouse 44 as determined at step 812, or upon adding another instantiation of knowledge item 46 at step 814, execution proceeds to step 816 where module 48 determines whether another knowledge item 46 generated by a knowledge worker is to be reviewed. If so, execution returns to step 780. If not, execution terminates at step 818.

Although the present invention has been described with several embodiments, a myriad of changes, variations, alterations, transformations, and modifications may be suggested to one skilled in the art, and it is intended that the present invention encompasses such changes, variations, alterations, transformations, and modifications as fall within the spirit and scope of the appended claims.

What is claimed is:

1. A system for retrieving documents, comprising:
    a memory operable to store a plurality of knowledge modules, each knowledge module comprising a business process having a plurality of subprocesses, and further operable to store a plurality of documents, each document comprising a plurality of first answers to a first group of questions and a plurality of second answers to a second group of questions, wherein the first and second groups of questions are associated with a business task corresponding to one of the knowledge modules; and
    a processor coupled to the memory and operable to:
        execute a selected knowledge module associated with a selected business task;
        present to a knowledge worker the first group of questions and the second group of questions associated with the selected business task; and
        retrieve from the memory those documents having a predetermined number of first answers matching the answers of the knowledge worker to the first group of questions and a predetermined number of second answers matching the answers of the knowledge worker to the second group of questions.

2. The system of claim 1, wherein the processor is further operable to initiate a graphical user interface comprising a plurality of displays, each display corresponding to a subprocess of the selected knowledge module and at least one of the displays operated by the knowledge worker to perform a portion of the business process of the selected knowledge module using at least one document.

3. The system of claim 1, wherein:
the memory is further operable to store a plurality of knowledge items;
the processor is further operable to perform a query session with the knowledge worker and to retrieve a plurality of knowledge items based upon the results of the query session, wherein at least one knowledge item is evaluated by the knowledge worker using at least one document.

4. The system of claim 1, wherein each document is associated with a particular knowledge module and includes first information associated with a first subprocess of the particular knowledge module and second information associated with a second subprocess of the particular knowledge module.

5. The system of claim 2, wherein the processor is further operable to present information from at least one retrieved document in at least one of the displays.

6. The system of claim 1, wherein the first group of questions comprises questions associated with a first subject of the selected knowledge module and the second group of questions comprises questions associated with a second subject of the selected knowledge module.

7. The system of claim 1, wherein the predetermined number of first answers is selected by the knowledge worker.

8. The system of claim 1, wherein the processor is further operable to:
determine a first weighting factor for the first group of questions and a second weighting factor for the second group of questions; and
retrieve the documents using the first weighting factor and the second weighting factor.

9. The system of claim 1, wherein the processor is further operable to retrieve those documents having a predetermined total number of answers matching the answers of the knowledge worker.

10. A method for retrieving documents, comprising:
storing a plurality of knowledge modules, each knowledge module comprising a business process having a plurality of subprocesses;
storing a plurality of documents, each document comprising a plurality of first answers to a first group of questions and a plurality of second answers to a second group of questions, wherein the first and second groups of questions are associated with a business task corresponding to one of the knowledge modules;
executing a selected knowledge module associated with a selected business task;
presenting to a knowledge worker the first group of questions and the second group of questions associated with the selected business task; and
retrieving from the memory those documents having a predetermined number of first answers matching the answers of the knowledge worker to the first group of questions and a predetermined number of second answers matching the answers of the knowledge worker to the second group of questions.

11. The method of claim 10, further comprising initiating a graphical user interface comprising a plurality of displays, each display corresponding to a subprocess of the selected knowledge module and at least one of the displays operated by the knowledge worker to perform a portion of the business process of the selected knowledge module using at least one document.

12. The method of claim 10, further comprising:
storing a plurality of knowledge items;
performing a query session with the knowledge worker; and
retrieving a plurality of knowledge items based upon the results of the query session.

13. The method of claim 11, wherein a display is operated by a knowledge worker to evaluate a knowledge item using at least one document.

14. The method of claim 10, wherein each document is associated with a particular knowledge module and includes first information associated with a first subprocess of the particular knowledge module and second information associated with a second subprocess of the particular knowledge module.

15. The method of claim 11, further comprising presenting information from at least one retrieved document in at least one of the displays.

16. The method of claim 10, wherein the first group of questions comprises questions associated with a first subject of the selected knowledge module and the second group of questions comprises questions associated with a second subject of the selected knowledge module.

17. The method of claim 10, wherein the predetermined number of first answers is selected by the knowledge worker.

18. The method of claim 10, further comprising:
determining a first weighting factor for the first group of questions; and
determining a second weighting factor for the second group of questions, wherein the step of retrieving further comprises retrieving the documents using the first weighting factor and the second weighting factor.

19. The method of claim 10, wherein the step of retrieving further comprises retrieving documents having a predetermined total number of answers matching the answers of the knowledge worker.

20. A mindflow document, comprising:
a first identifier associated with a knowledge module executed by a knowledge worker, wherein the knowledge module is associated with a query session performed by the knowledge worker and comprises a business process having a plurality of subprocesses, the query session comprising first and second groups of questions associated with a business task of the knowledge module;
a second identifier associated with the knowledge worker; and
information associated with the query session, the information comprising a plurality of first answers to the first group of questions provided by the knowledge worker and a plurality of second answers to the second group of questions provided by the knowledge worker.

21. The mindflow document of claim 20, wherein:
the information associated with the query session comprises first information; and
the document further comprises second information associated with a first subprocess of the knowledge module and third information associated with a second subprocess of the knowledge module.

22. The mindflow document of claim 21, wherein the first subprocess is performed by the knowledge worker to evaluate a knowledge item used to perform a portion of the business process and the second information defines the evaluation of the knowledge item.

23. The mindflow document of claim 22, wherein the knowledge worker comprises a first knowledge worker and the second information is used by a second knowledge worker to perform a portion of the business process.

24. The mindflow document of claim 20, wherein the knowledge worker comprises a first knowledge worker and the document further comprises a status identifier indicating whether a predetermined number of the first answers match the answers to the first group of questions provided by a second knowledge worker performing the query session and a predetermined number of the second answers match the answers to the second group of questions provided by the second knowledge worker performing the query session.

\* \* \* \* \*